(12) United States Patent
Palser

(10) Patent No.: US 12,151,370 B1
(45) Date of Patent: Nov. 26, 2024

(54) MECHANICAL JOINT ASSEMBLIES WITH BROAD RANGES OF MOTION AND PRECISE MOTION AND POSITIONAL CONTROLS

(71) Applicant: Drew Jordan Palser, Cheyenne, WY (US)

(72) Inventor: Drew Jordan Palser, Cheyenne, WY (US)

(*) Notice: Subject to any disclaimer, the term of this patent is extended or adjusted under 35 U.S.C. 154(b) by 0 days.

(21) Appl. No.: 18/407,614

(22) Filed: Jan. 9, 2024

(51) Int. Cl.
*B25J 9/00* (2006.01)
*B25J 9/12* (2006.01)

(52) U.S. Cl.
CPC ............ *B25J 9/0048* (2013.01); *B25J 9/126* (2013.01)

(58) Field of Classification Search
CPC .......... F16H 21/51; B25J 9/0048; B25J 9/126
See application file for complete search history.

(56) References Cited

U.S. PATENT DOCUMENTS

| | | | | |
|---|---|---|---|---|
| 4,628,765 A * | 12/1986 | Dien | ................... | B25J 17/0275 |
| | | | | 901/29 |
| 9,044,346 B2 | 6/2015 | Langlois et al. | | |
| 9,949,801 B2 | 4/2018 | Hourtash et al. | | |
| 2009/0271038 A1 | 10/2009 | Song et al. | | |
| 2013/0253385 A1 | 9/2013 | Goffer et al. | | |
| 2014/0043704 A1 * | 2/2014 | Hultberg | ................. | F16H 21/52 |
| | | | | 359/838 |
| 2020/0376687 A1 * | 12/2020 | Noh | ........................ | H02K 9/18 |
| 2021/0086350 A1 * | 3/2021 | Nose | ....................... | B25J 9/126 |

FOREIGN PATENT DOCUMENTS

| | | |
|---|---|---|
| CN | 101491898 | 10/2009 |
| CN | 102145815 | 2/2013 |
| CN | 104015829 | 5/2016 |
| CN | 107802384 | 3/2018 |
| WO | WO2017079788 | 5/2017 |

OTHER PUBLICATIONS

Image of "Helicopter" [retrieved on Mar. 22, 2024] https://images.app.goo.gl/e5NeiwoznVtB8cZP9.

* cited by examiner

*Primary Examiner* — Charles A Fox
*Assistant Examiner* — Gregory T Prather
(74) *Attorney, Agent, or Firm* — Red Rocks Law, LLC

(57) ABSTRACT

Disclosed herein are various embodiments of mechanical joint assemblies with broad ranges of motion. The joint assemblies can be used to control the position of a mounting surface, with the motion and position of the joint assembly being precisely controllable, for instance by one or more stepper motors.

16 Claims, 30 Drawing Sheets

FIG. 5    RIGHT

FIG. 6 LEFT

FIG. 7  DOWN RIGHT

UP LEFT

FIG. 9 DOWN LEFT

FIG. 10 UP RIGHT

UP

DOWN

FIG. 17  DOWN RIGHT

UP LEFT

FIG. 19  DOWN LEFT

UP RIGHT

UP

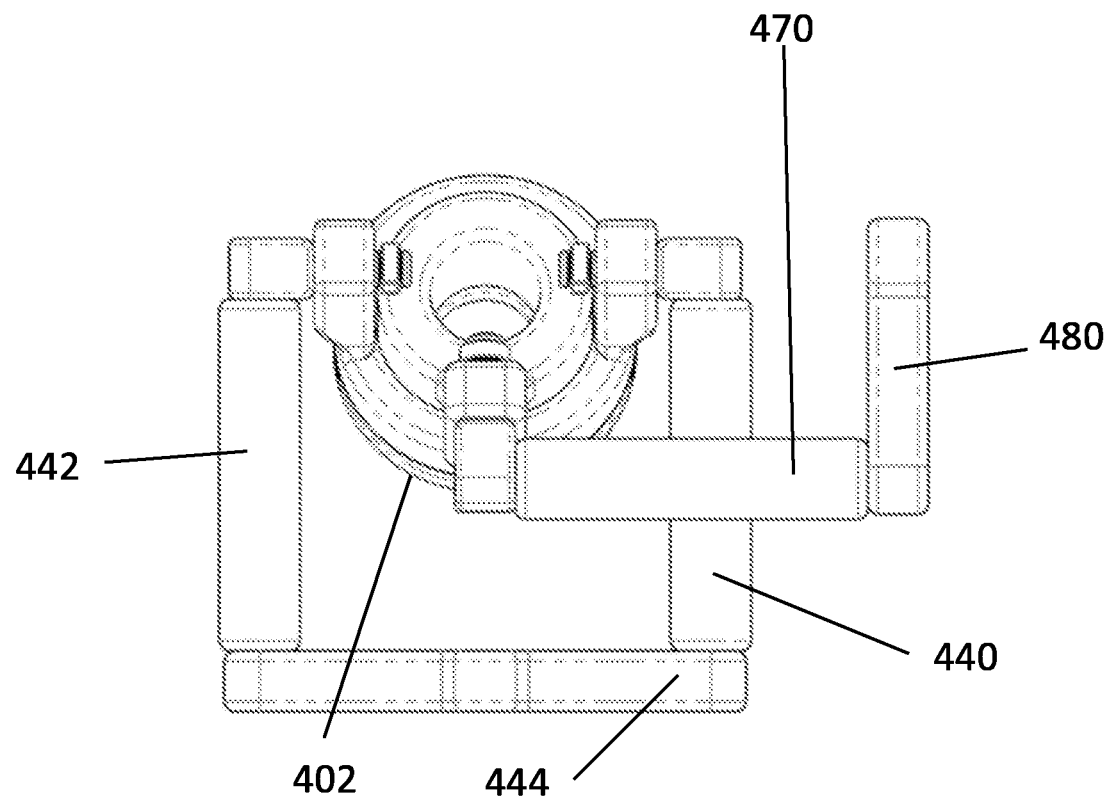
FIG. 24 DOWN

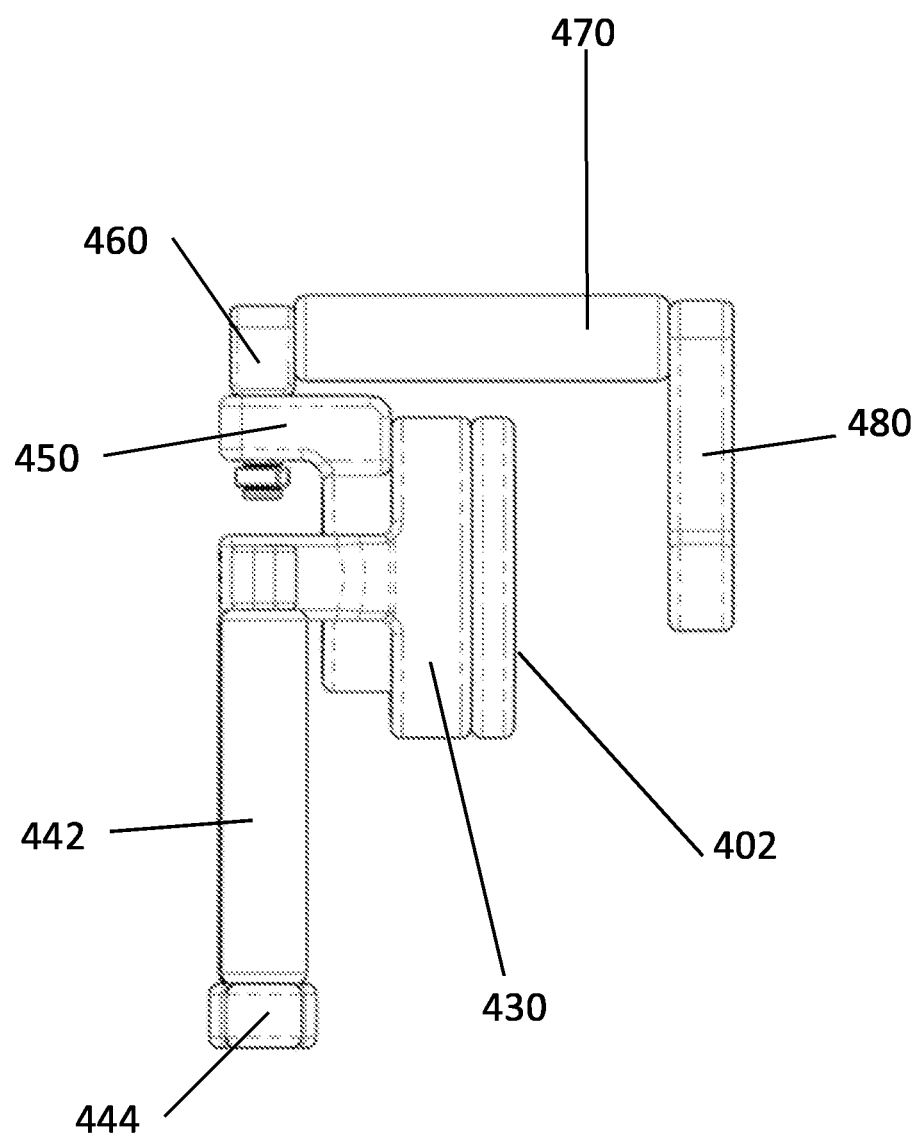
FIG. 25 RIGHT

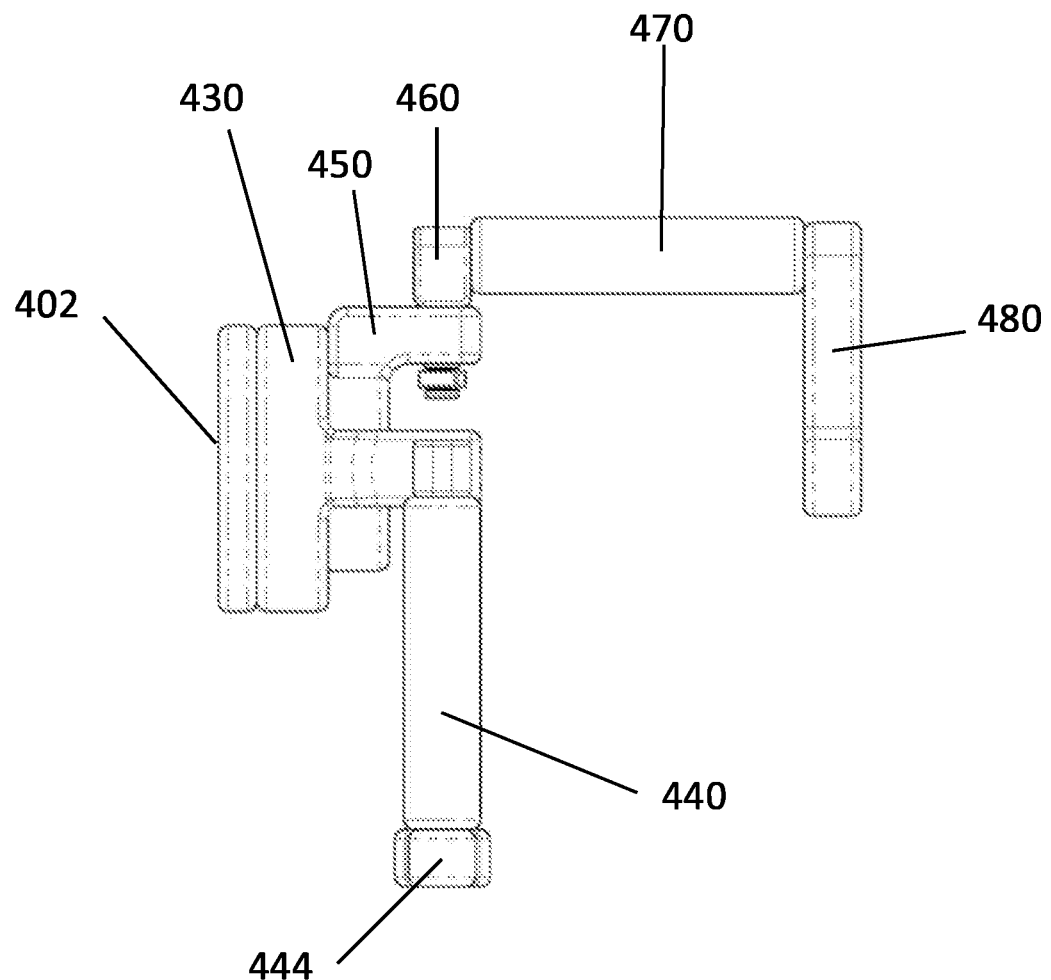
FIG. 26 LEFT

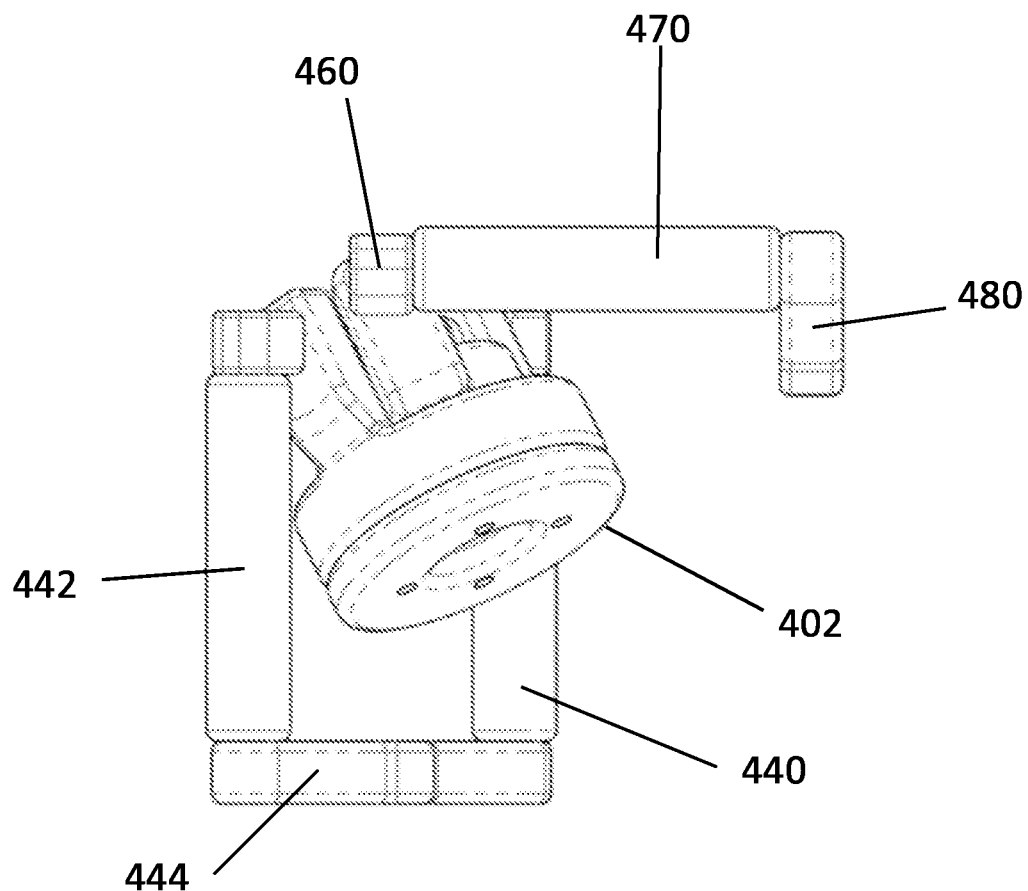
FIG. 27  DOWN RIGHT

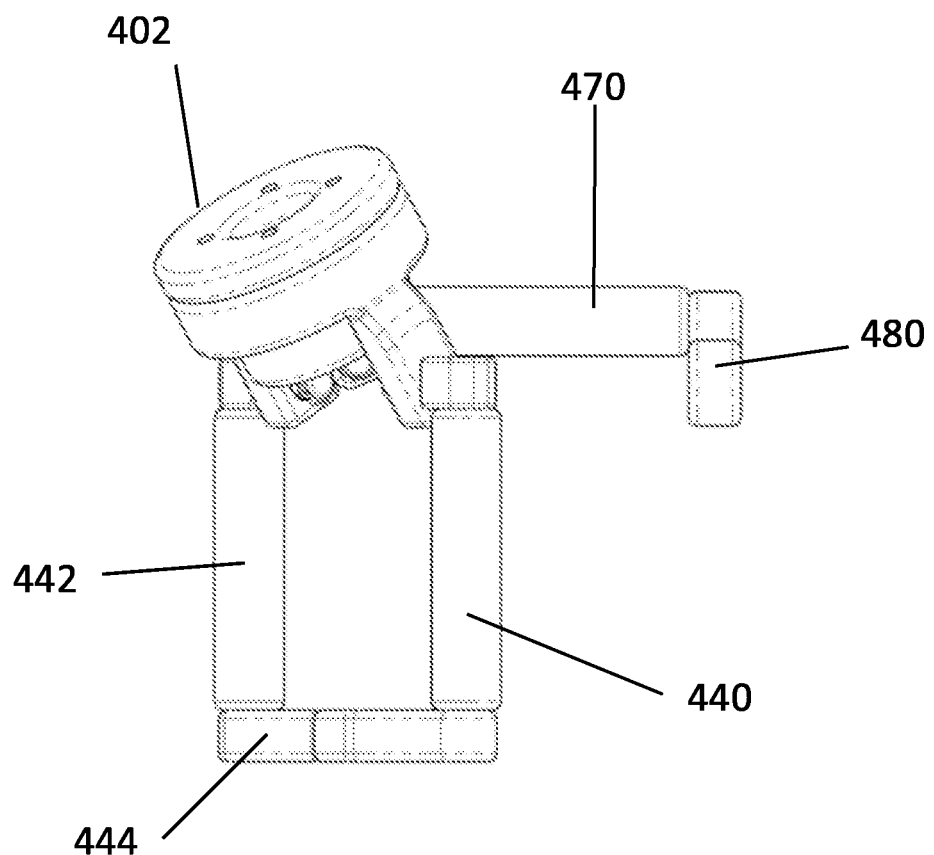
FIG. 28   UP LEFT

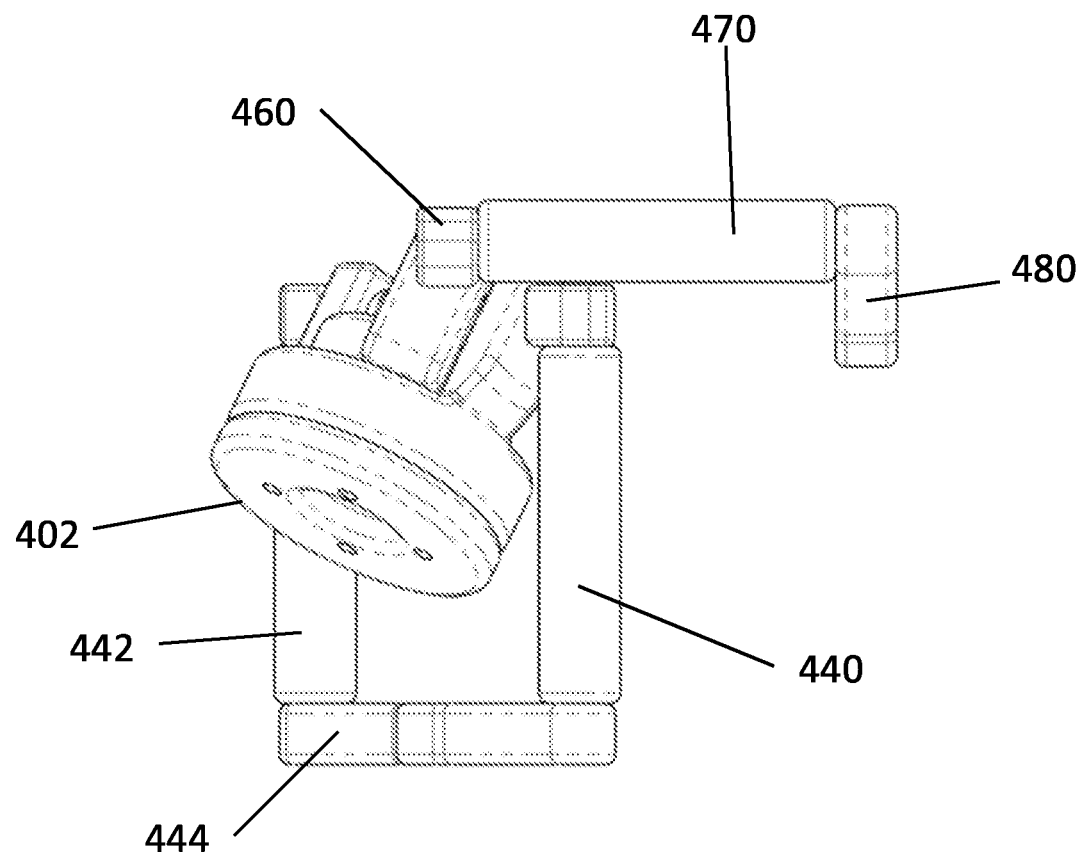
FIG. 29    DOWN LEFT

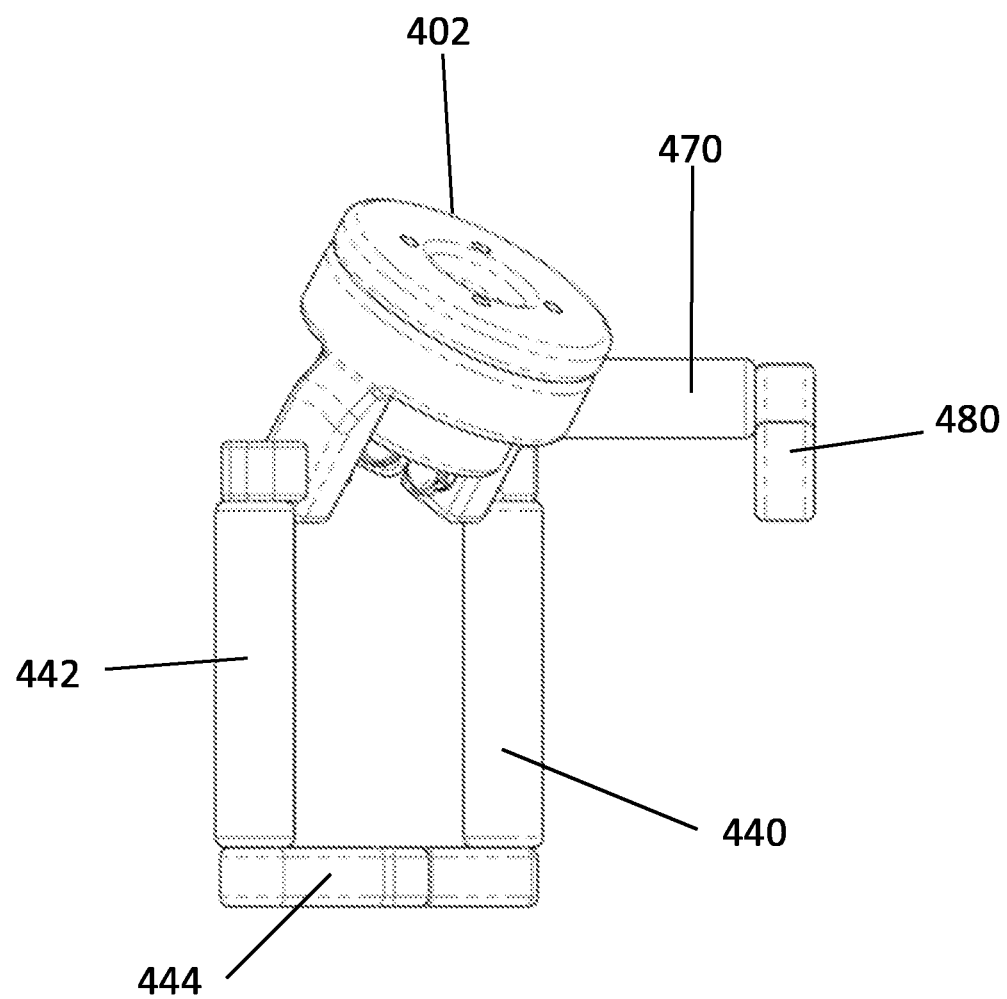
FIG. 30  UP RIGHT

MECHANICAL JOINT ASSEMBLIES WITH BROAD RANGES OF MOTION AND PRECISE MOTION AND POSITIONAL CONTROLS

TECHNICAL FIELD

This application relates, in general, to mechanical joints.

BACKGROUND

In a variety of applications, conventional mechanical joints provide various directions or pathways of motion, with various ranges of motion. For instance, a conventional ball joint typically has a range of motion in a horizontal and vertical plane as well as supporting some rotational motion, however is limited in its range of motion due to its base structure.

Moreover, the present inventor has recognized that it can be difficult to control the precise position of a ball joint when used in electromechanical applications.

SUMMARY

In light of the above and according to one broad aspect of one embodiment of the present disclosure, disclosed herein are mechanical joint assemblies with broad ranges of motion and having their motion and position being precisely controllable, for instance by one or more stepper motors.

According to another broad aspect of one embodiment of the present disclosure, disclosed herein is a joint assembly for controlling movement of a mounting surface. The joint assembly can be under the control of a first motor coupled with a first shaft, and a second motor coupled with a second shaft. In one example, the joint assembly may include a first axis member coupled with the mounting surface; a first horizontal member having a first end and a second end, the first end of the first horizontal member pivotally coupled with the first axis member; a second horizontal member having a first end and a second end, the first end of the second horizontal member pivotally coupled with the first axis member; a horizontal link member having a first end and a second end, the first end of the horizontal link member pivotally coupled with the second end of the first horizontal member, and the second end of the horizontal link member pivotally coupled with the second end of the second horizontal member; a second axis member coupled with the mounting surface; an upper member having a first end and a second end, the first end of the upper member pivotally coupled with the second axis member; a lower member having a first end and a second end, the first end of the lower member pivotally coupled with the second axis member; and a vertical link member having a first end and a second end, the first end of the vertical link member pivotally coupled with the second end of the upper member, and the second end of the vertical link member pivotally coupled with the second end of the lower member.

In one embodiment, the first motor is attached via the first shaft to the horizontal link member, and as the first motor rotates the first shaft in a clockwise direction, the mounting surface tilts left; and as the first motor rotates the first shaft counter-clockwise, the mounting surface tilts right.

In another example, the second motor is attached via the second shaft to the vertical link member, and as the second motor rotates the second shaft in a clockwise direction, the mounting surface tilts upwardly; as the second motor rotates the second shaft in a counter-clockwise direction, the mounting surface tilts downwardly.

In one embodiment, the first axis member has a first horizontal flange extending outwardly from the first axis member, and the first axis member has a second horizontal flange extending outwardly from the first axis member. The first horizontal flange may be aligned with the second horizontal flange, with the first horizontal flange positioned on an opposing portion of the first axis member as the second horizontal flange.

In another embodiment, the second axis member has a first vertical flange extending outwardly from the second axis member, and the second axis member has a second vertical flange extending outwardly from the second axis member. The first vertical flange may be aligned with the second vertical flange, with the first vertical flange positioned on an opposing portion of the second axis member as the second vertical flange.

In one example, various components of the joint assembly may be integrated as a single structure, such as but not limited to the first axis member, the first horizontal flange, the second horizontal flange, the second axis member, the first vertical flange, and the second vertical flange.

Various materials such as metal, plastic, rubber, graphite, carbon fiber or other material may be used to form one or more portions of the joint assembly. In one example, the first horizontal member, the second horizontal member, and the horizontal link member are formed of metal.

According to another broad aspect of one embodiment of the present disclosure, disclosed herein is a joint assembly for controlling movement of a mounting surface. In one embodiment, the joint assembly may include a first motor coupled with a first shaft; a second motor coupled with a second shaft; a first axis member coupled with the mounting surface; a first horizontal member having a first end and a second end, the first end of the first horizontal member pivotally coupled with the first axis member; a second horizontal member having a first end and a second end, the first end of the second horizontal member pivotally coupled with the first axis member; a horizontal link member having a first end and a second end, the first end of the horizontal link member pivotally coupled with the second end of the first horizontal member, and the second end of the horizontal link member pivotally coupled with the second end of the second horizontal member; a second axis member coupled with the mounting surface; an upper member having a first end and a second end, the first end of the upper member pivotally coupled with the second axis member; a lower member having a first end and a second end, the first end of the lower member pivotally coupled with the second axis member; a vertical link member having a first end and a second end, the first end of the vertical link member pivotally coupled with the second end of the upper member, and the second end of the vertical link member pivotally coupled with the second end of the lower member; wherein the first motor is attached via the first shaft to the horizontal link member, and wherein as the first motor rotates the first shaft in a clockwise direction, the mounting surface tilts left; and wherein the second motor is attached via the second shaft to the vertical link member, and wherein as the second motor rotates the second shaft in a clockwise direction, the mounting surface tilts upwardly.

Other embodiments of the disclosure are described herein. The features, utilities and advantages of various embodiments of this disclosure will be apparent from the following more particular description of embodiments as illustrated in the accompanying drawings.

BRIEF DESCRIPTION OF THE DRAWINGS

FIG. 24 illustrates a front view of the joint assembly of FIG. 21, with the mounting surface positioned down, in accordance with one embodiment of the present disclosure.

FIG. 25 illustrates a front view of the joint assembly of FIG. 21, with the mounting surface positioned right, in accordance with one embodiment of the present disclosure.

FIG. 26 illustrates a front view of the joint assembly of FIG. 21, with the mounting surface positioned left, in accordance with one embodiment of the present disclosure.

FIG. 27 illustrates a front view of the joint assembly of FIG. 21, with the mounting surface positioned down and right, in accordance with one embodiment of the present disclosure.

FIG. 28 illustrates a front view of the joint assembly of FIG. 21, with the mounting surface positioned up and left, in accordance with one embodiment of the present disclosure.

FIG. 29 illustrates a front view of the joint assembly of FIG. 21, with the mounting surface positioned down and left, in accordance with one embodiment of the present disclosure.

FIG. 30 illustrates a front view of the joint assembly of FIG. 21, with the mounting surface positioned up and right, in accordance with one embodiment of the present disclosure.

DETAILED DESCRIPTION

Figure 1:
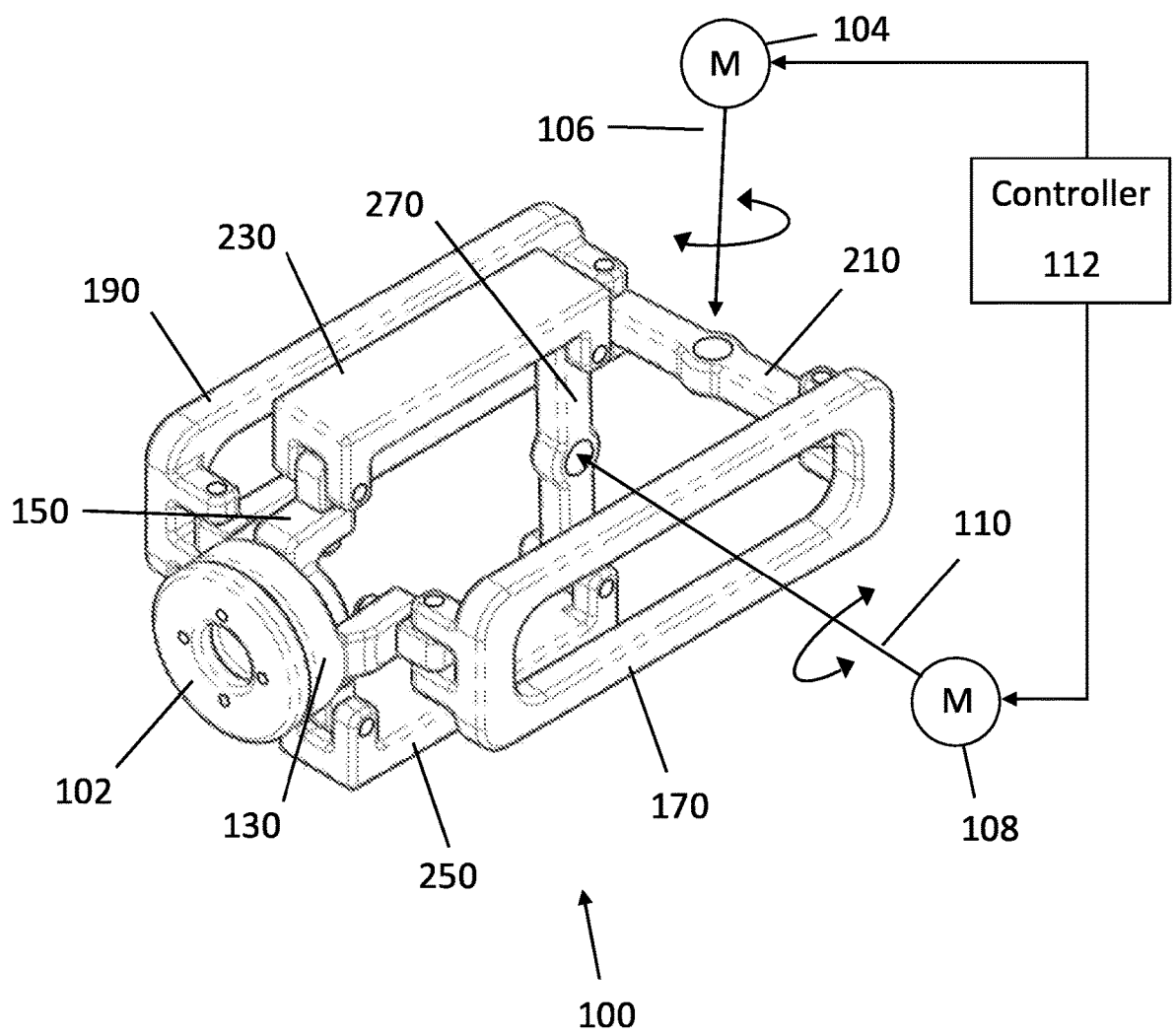
FIG. 1 illustrates an example of a joint assembly 100 for controlling the position of a mounting surface, in accordance with one embodiment of the present disclosure.

Disclosed herein are various embodiments of a mechanical joint assembly with broad ranges of motion and having their motion and position being precisely controllable, for instance by one or more stepper motors. Embodiments of the present disclosure can be used in a variety of applications, such as robotics, prosthetics (thumb joint, wrist joint, shoulder joint, hip joint, ankle joint, neck); cameras (security or robotic); drones by being able to move the propellers in any given direction; anywhere a ball joint could be used but can be controlled; multi-axis manufacturing; firefighting (robotic arms that can precisely aim water or fire extinguisher with easy to use (X, Y) coordinate system controls). Various embodiments of a mechanical joint assembly are disclosed herein.

The following detailed description refers to the accompanying drawings that depict various details of examples selected to show how particular embodiments may be implemented. The discussion herein addresses various examples of the inventive subject matter at least partially in reference to these drawings and describes the depicted embodiments in sufficient detail to enable those skilled in the art to practice the embodiments. Many other embodiments may be utilized for practicing the subject matter other than the illustrative examples discussed herein, and many structural and operational changes in addition to the alternatives specifically discussed herein may be made without departing from the scope of the disclosed subject matter.

In this description, references to "one embodiment" or "an embodiment," or to "one example" or "an example" mean that the feature being referred to is, or may be, included in at least one embodiment or example of the disclosure. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present disclosure includes a variety of combinations and/or integrations of the embodiments and examples described herein, as well as further embodiments and examples as defined within the scope of all claims based on this disclosure, as well as all legal equivalents of such claims.

Referring to FIGS. 1-10, an embodiment of a controllable mechanical joint assembly 100 is illustrated. The joint assembly 100 includes a joint mounting surface 102, and as described herein mounting surface 102 can be controllably moved and positioned through a broad range of motion into a variety of differing positions. In one example, a pair of motors 104, 108 (such as stepper motors) are coupled with or connected to joint assembly 100, so that motors 104, 108 can precisely control the motion and position of the mounting surface 102 of joint assembly 100. In one example, motor 104 may be connected to joint assembly 100 via a motor shaft or linkage 106; and motor 108 may be connected to joint assembly 100 via a motor shaft or linkage 110. The motors 104, 108 can each independently rotate their respective shafts 106, 110 either clockwise or counter-clockwise.

In one example, the joint assembly 100 can be attached to a first surface or structure, and the joint mounting surface 102 can be attached to a device, item, structure, or other surface that is desired to be controllably moved. As described herein, the joint assembly is configured to controllably move mounting surface 102 in a variety of motions and angles with a broad range of movement.

In one example, a controller 112 (such as a programmable logic controller, microprocessor, microcontroller, computer, or other computing device) can be coupled with motors 104, 108 so that the activation and the control of movement of motors 104, 108 are precisely controlled by controller 112, for instance under operation of a computer program, software, artificial intelligence processes, machine learning processes, or other logic.

There are various modes, states or scenarios which motors 104, 108 can be operated together or separately; for instance, as shown in Table 1:

| State of Motor 104 and Direction of Rotation | State of Motor 108 and Direction of Rotation | Resulting Motion of Joint Mounting Surface 102 |
|---|---|---|
| ON (Clockwise) | OFF | Surface 102 tilts Left |
| ON (Counter-Clockwise) | OFF | Surface 102 tilts Right |
| OFF | ON (Clockwise) | Surface 102 tilts Upward |
| OFF | ON (Counter-Clockwise) | Surface 102 tilts Downward |
| ON (Clockwise) | ON (Clockwise) | Surface 102 tilts Left and Upward |
| ON (Clockwise) | ON (Counter-Clockwise) | Surface 102 tilts Left and Downward |
| ON (Counter-Clockwise) | ON (Clockwise) | Surface 102 tilts Right and Upward |
| ON (Counter-Clockwise) | ON (Counter-Clockwise) | Surface 102 tilts Right and Downward |

For each of these modes, the degree or amount to which motor 104 and/or motor 108 is rotated will also control and affect the position (i.e., angular position, tilt) of joint mounting surface 102. In one example, surface 102 can move approximately 94 degrees in each direction from a center position; and the degrees of movement of surface 102 to the corners from a center position (i.e., up and to the right) is approximately 65 degrees.

In this manner, it can be seen that joint assembly 100 converts simple rotary motion of motor 104 through shaft 106, and simple rotary motion of motor 108 through shaft 110, into a variety of differing positions of mounting surface 102 through a broad range of motion.

Figure 2:
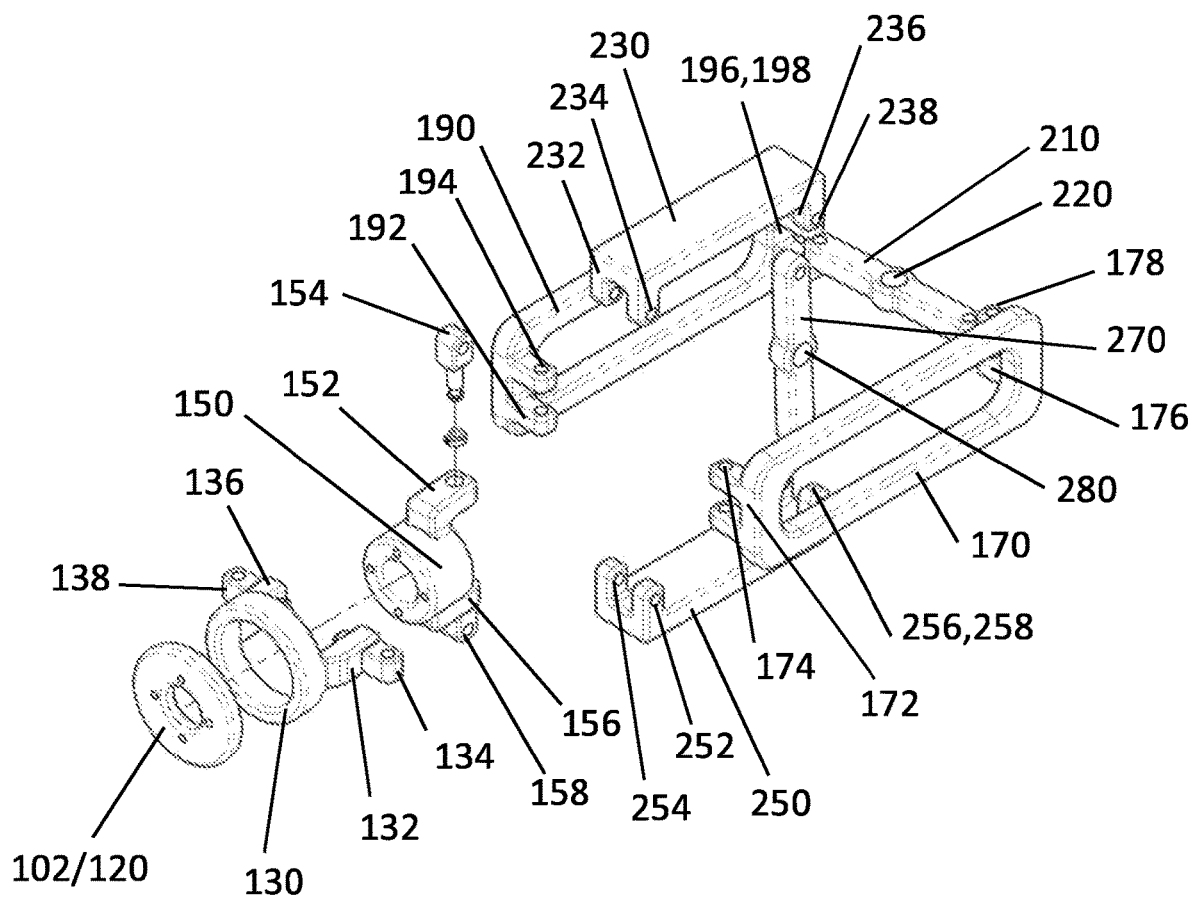
FIG. 2 illustrates an exploded view of the joint assembly of FIG. 1, in accordance with one embodiment of the present disclosure.

Referring to FIG. 2, joint assembly 100 may include a base plate 120 which can be used to form mounting surface 102. A first axis member 130 can be provided and positioned proximate to base plate 120. First axis member 130 may include a first horizontal flange 132 defining an opening to receive a first pivot member 134. First axis member 130 may also include a second horizontal flange 136 defining an opening to receive a second pivot member 138. In one example as shown in FIG. 2, horizontal flanges 132, 136 may be positioned and aligned in parallel on opposing positions of first axis member 130.

A second axis member 150 may be adapted configured to fit within first axis member 130. Second axis member 150 may include a first vertical flange 152 defining an opening to receive a third pivot member 154, and may also include a second vertical flange 156 defining an opening to receive a fourth pivot member 158. In one example as shown in FIG. 2, vertical flanges 152, 156 may be positioned and aligned in parallel on opposing positions of second axis member 150.

Pivot members 134, 138, 154 and 158 each include an opening to receive a pin so that other portions of joint assembly 100 can be connected respectively to the pivot members using a pin, screw, or other securing mechanisms.

In one example, a set of screws, bolts, or other securing mechanisms (such as welds and/or adhesives or other conventional securement techniques) may be used to fixedly attach together base plate 120, first axis member 130, and second axis member 150.

A first horizontal member 170 may be generally elongated and may include at one end a set of parallel protrusions 172 defining a first set of openings 174, and may include at the opposing end a set of parallel protrusions 176 defining a second set of openings 178. First horizontal member 170 may have a generally oval shape defining a generally elongated oval opening therein.

A second horizontal member 190 may be generally elongated and may include at one end a set of parallel protrusions 192 defining a first set of openings 194, and may include at the opposing end a set of parallel protrusions 196 defining a second set of openings 198. Second horizontal member 190 may have a generally oval shape defining a generally elongated oval opening therein.

A horizontal link member 210 may be elongated with a first end a second end, and horizontal link member 210 can be provided to pivotally connect between the distal ends of first horizontal member 170 and second horizontal member 190. Horizontal member 210 may have its ends positioned between the protrusions 176 and 196, and may be secured therein using pins, screws, or other securing mechanisms. Horizontal link member 210 also includes an opening 220 which is adapted to receive and be securely connected with shaft 106 of motor 104; such that when motor 104 is activated to rotate shaft 106 either clockwise or counter-clockwise, then horizontal link member 210 will also correspondingly rotate clockwise or counter-clockwise in a horizontal plane.

First horizontal member 170 is also pivotally connected, by its protrusions 172, to the first pivot member 134 using pins, screws, or other securing mechanisms. Second horizontal member 190 is also pivotally connected, by its protrusions 192, to the second pivot member 138 using pins, screws, or other securing mechanisms.

Figure 5:
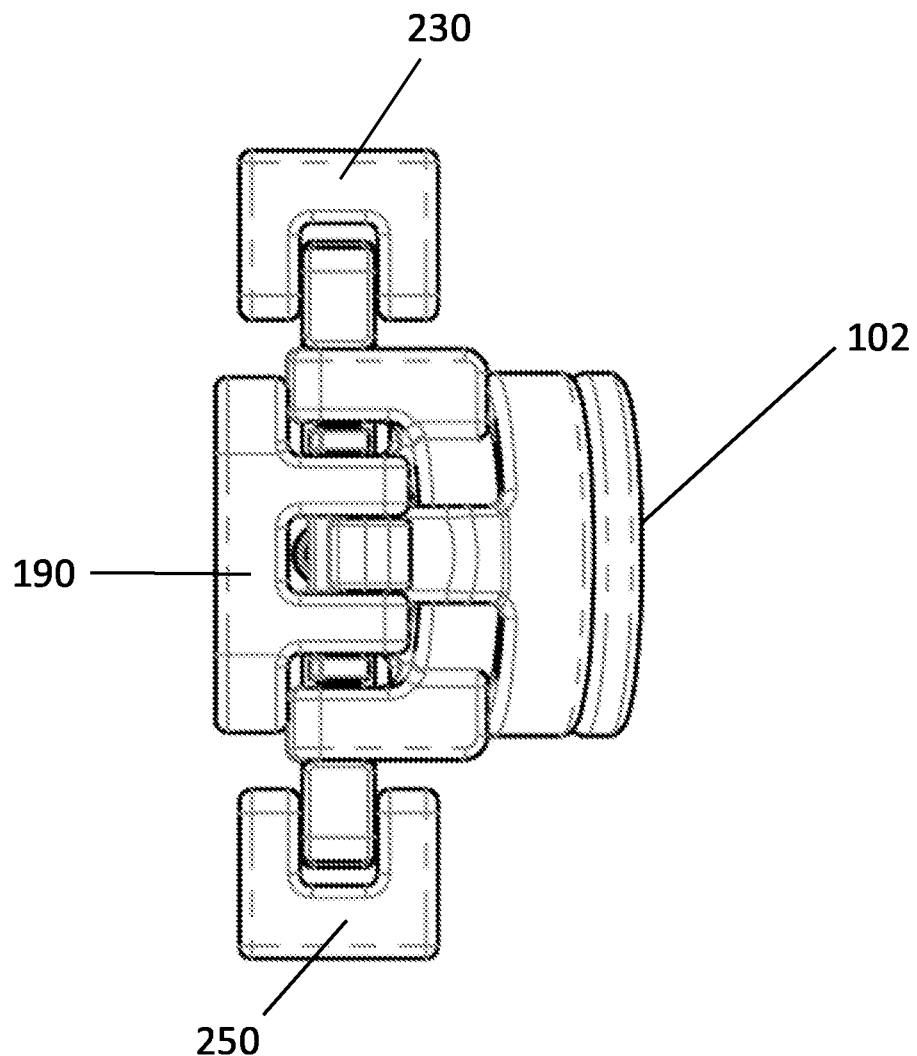
FIG. 5 illustrates a front view of the joint assembly of FIG. 1, with the mounting surface positioned right, in accordance with one embodiment of the present disclosure.

In this manner, these components are connected together: the first axis member 130 (which is coupled with base plate 120 to form mounting surface 102), first horizontal member 170, the second horizontal member 190, and the horizontal link member 210. Since motor 104 is attached via shaft 106 to horizontal link 210, as shown in Table 1, when motor 104 rotates shaft 106 clockwise or counter-clockwise in a horizontal plane, the base plate 120/mounting surface 102 tilts to the left (FIG. 6) or tilts to the right (FIG. 5). Hence, it can be seen that joint assembly 100 converts rotary motion of motor 104/shaft 106 into left or right tilt of mounting surface 102.

As shown in FIG. 1, joint assembly 100 may also include an upper member 230, a lower member 250, and a vertical linking member 270.

The upper member 230 may be generally elongated and may include at one end a set of parallel protrusions 232 defining a first set of openings 234, and may include at the opposing end a set of parallel protrusions 236 defining a second set of openings 238.

The lower member 250 may be generally elongated and may include at one end a set of parallel protrusions 252 defining a first set of openings 254, and may include at the opposing end a set of parallel protrusions 256 defining a second set of openings 258.

Vertical link member 270 may be elongated with a first end a second end, and vertical link member 270 can be provided to pivotally connect between the distal ends of upper member 230 and lower member 250. Vertical member 270 may have its ends positioned between the protrusions 236 and 256, and may be secured therein using pins, screws, or other securing mechanisms. Vertical link member 270 also includes an opening 280 which is adapted to receive and be securely connected with shaft 110 of motor 108; such that when motor 108 is activated to rotate shaft 110 either clockwise or counter-clockwise, then vertical link member 270 will also correspondingly rotate clockwise or counter-clockwise in a vertical plane.

Upper member 230 is also pivotally connected, by its protrusions 232, to the third pivot member 154 of second axis member 150 using pins, screws, or other securing mechanisms. Lower member 250 is also pivotally connected, by its protrusions 252, to the fourth pivot member 158 of second axis member 150 using pins, screws, or other securing mechanisms.

In this manner, these components are connected together: the second axis member 150 (which is coupled with base plate 120 to form mounting surface 102), upper member 230, lower member 250, and the vertical link member 270. Since motor 108 is attached via shaft 110 to vertical link member 270, as shown in Table 1, when motor 108 rotates shaft 110 clockwise or counter-clockwise in a vertical plane, the base plate 120/mounting surface 102 tilts upwardly (FIG. 3) or tilts downwardly (FIG. 4). Hence, it can be seen that joint assembly 100 converts rotary motion of motor 108/shaft 110 into upward or downward tilt of mounting surface 102.

The components of the joint assembly 100 can be made of various materials, or combinations of materials, depending upon the implementation, such as but not limited to metal, plastic, rubber, graphite, carbon fiber, wood, magnetized materials, ferrous and non-ferrous materials, polymers, rigid materials, flexible materials, mildly flexible materials, and other conventional materials or any combinations thereof. One or more components described herein can be formed or integrated together, using conventional manufacturing processes such as but not limited to molds, injection moldings, CNC milling, 3D printing, or other conventional manufacturing techniques. For instance, and in one example, base plate 120, first axis member 130, and second axis member 150, and other components, may be formed or integrated into a single component, using molds, injection moldings, CNC milling, 3D printing, or other conventional manufacturing techniques.

Figure 3:
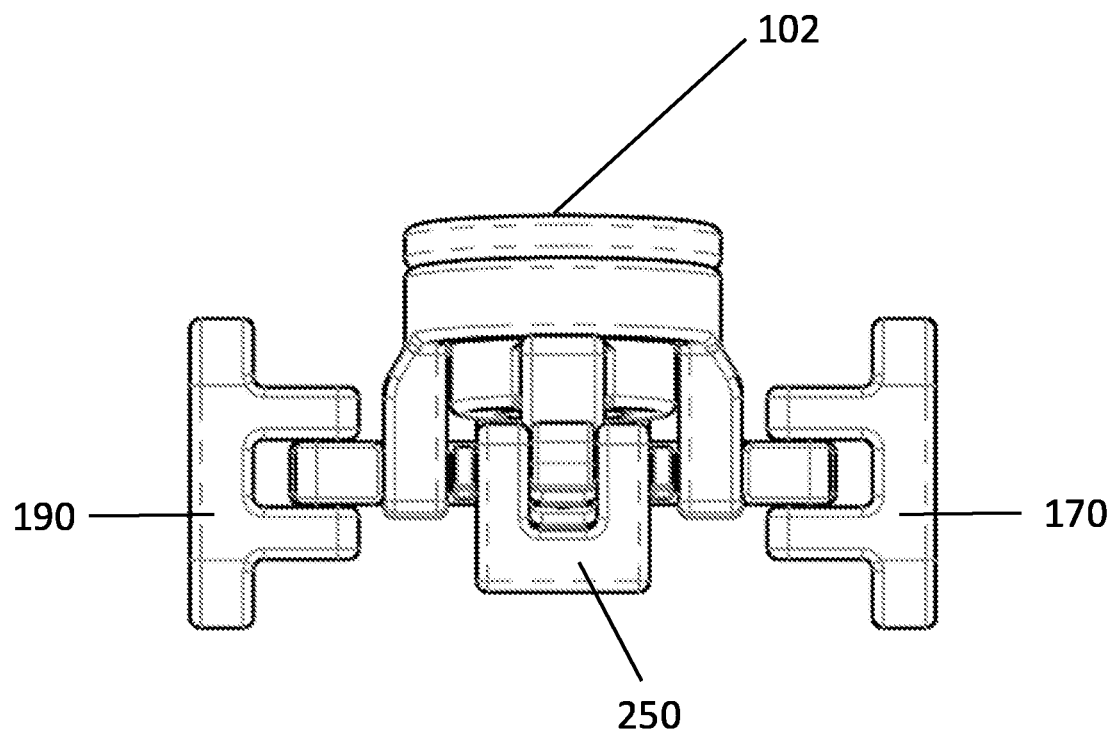
FIG. 3 illustrates a front view of the joint assembly of FIG. 1, with the mounting surface positioned up, in accordance with one embodiment of the present disclosure.
Figure 4:
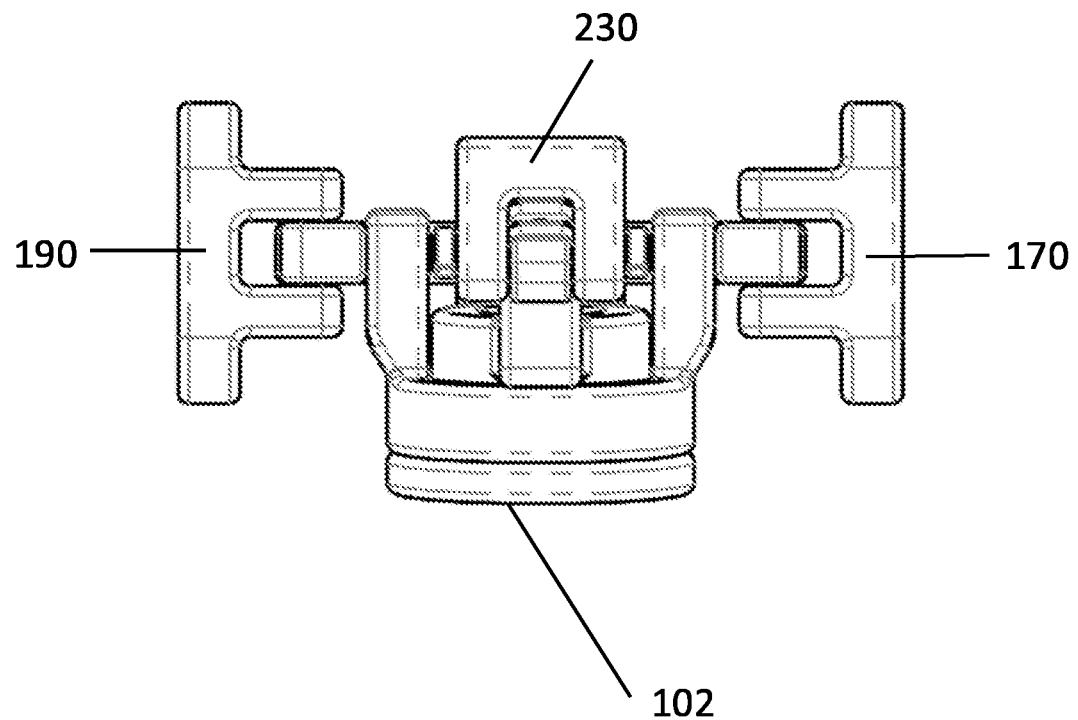
FIG. 4 illustrates a front view of the joint assembly of FIG. 1, with the mounting surface positioned down, in accordance with one embodiment of the present disclosure.
Figure 6:
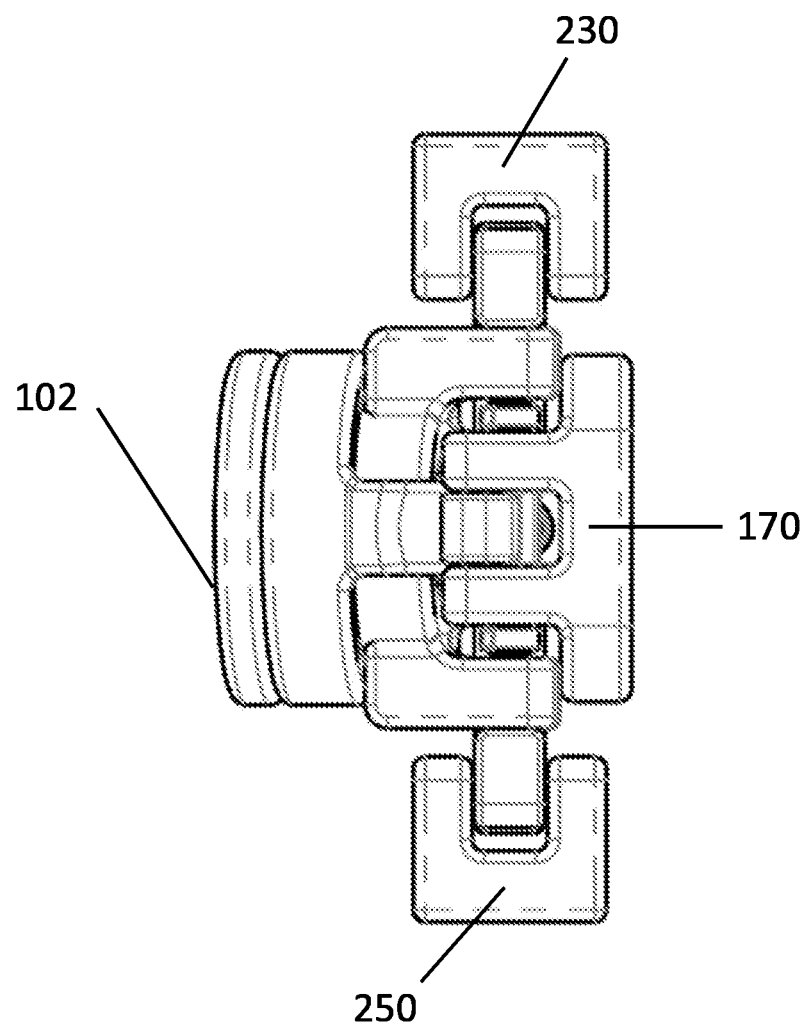
FIG. 6 illustrates a front view of the joint assembly of FIG. 1, with the mounting surface positioned left, in accordance with one embodiment of the present disclosure.
Figure 7:
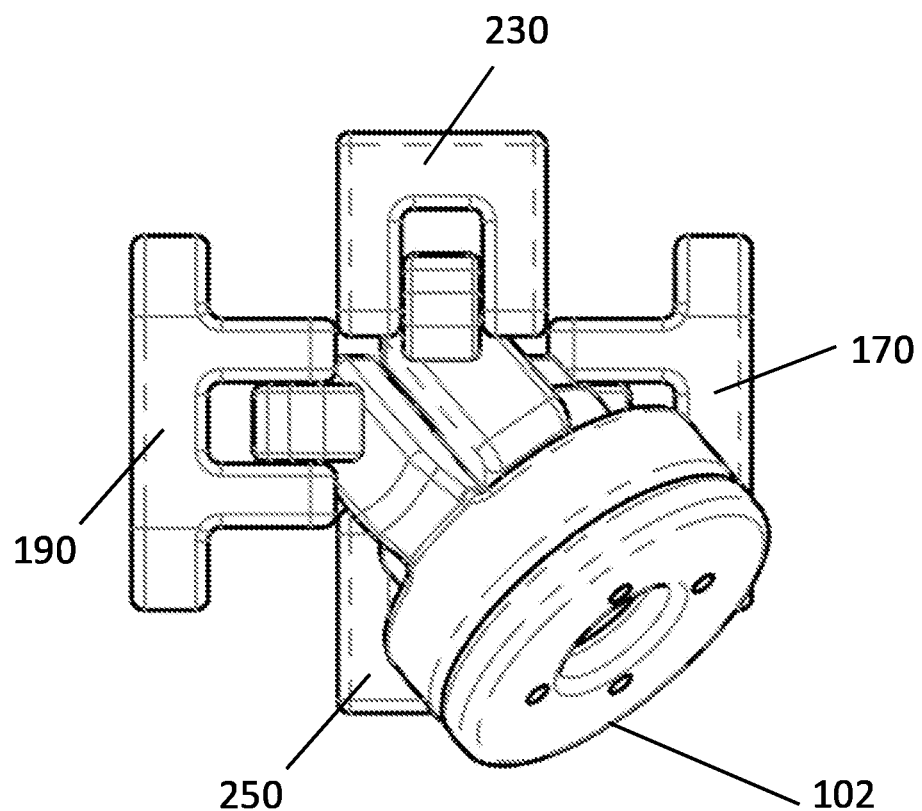
FIG. 7 illustrates a front view of the joint assembly of FIG. 1, with the mounting surface positioned down and right, in accordance with one embodiment of the present disclosure.
Figure 8:
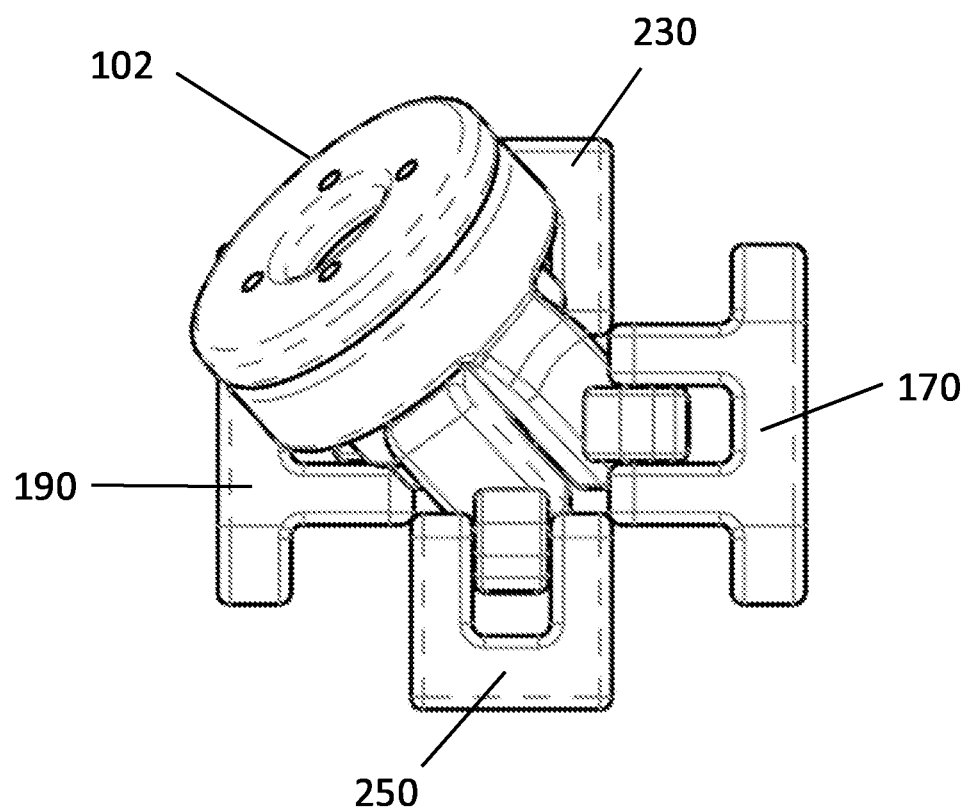
FIG. 8 illustrates a front view of the joint assembly of FIG. 1, with the mounting surface positioned up and left, in accordance with one embodiment of the present disclosure.
Figure 9:
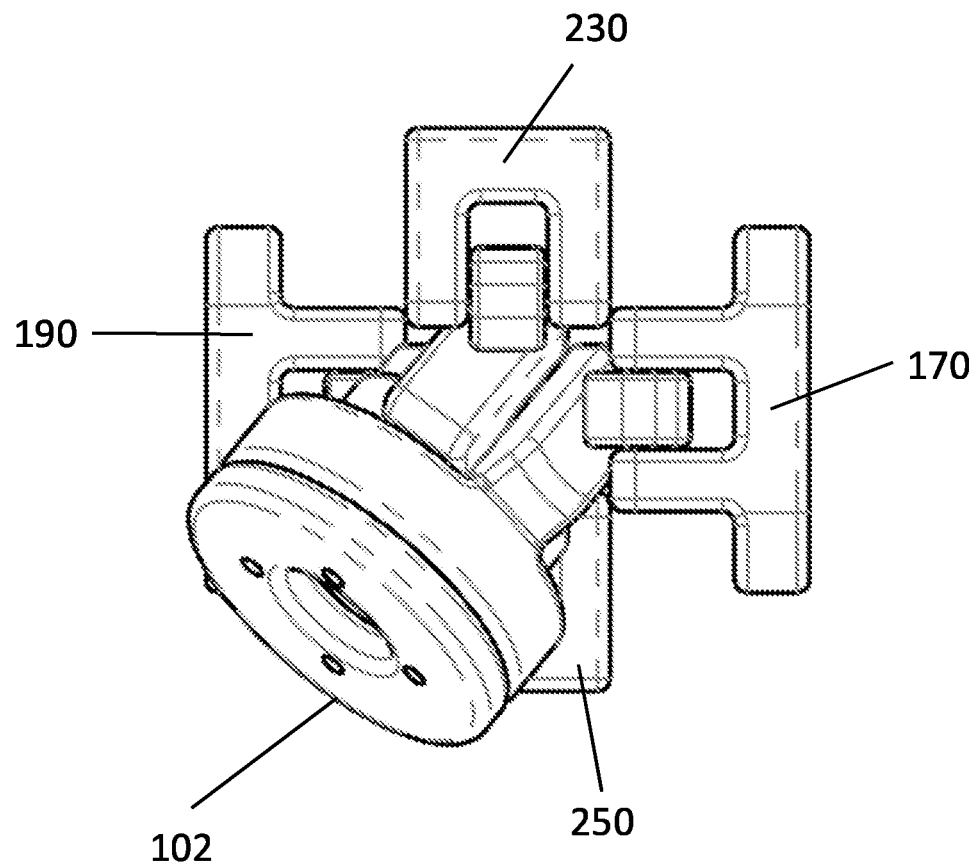
FIG. 9 illustrates a front view of the joint assembly of FIG. 1, with the mounting surface positioned down and left, in accordance with one embodiment of the present disclosure.
Figure 10:
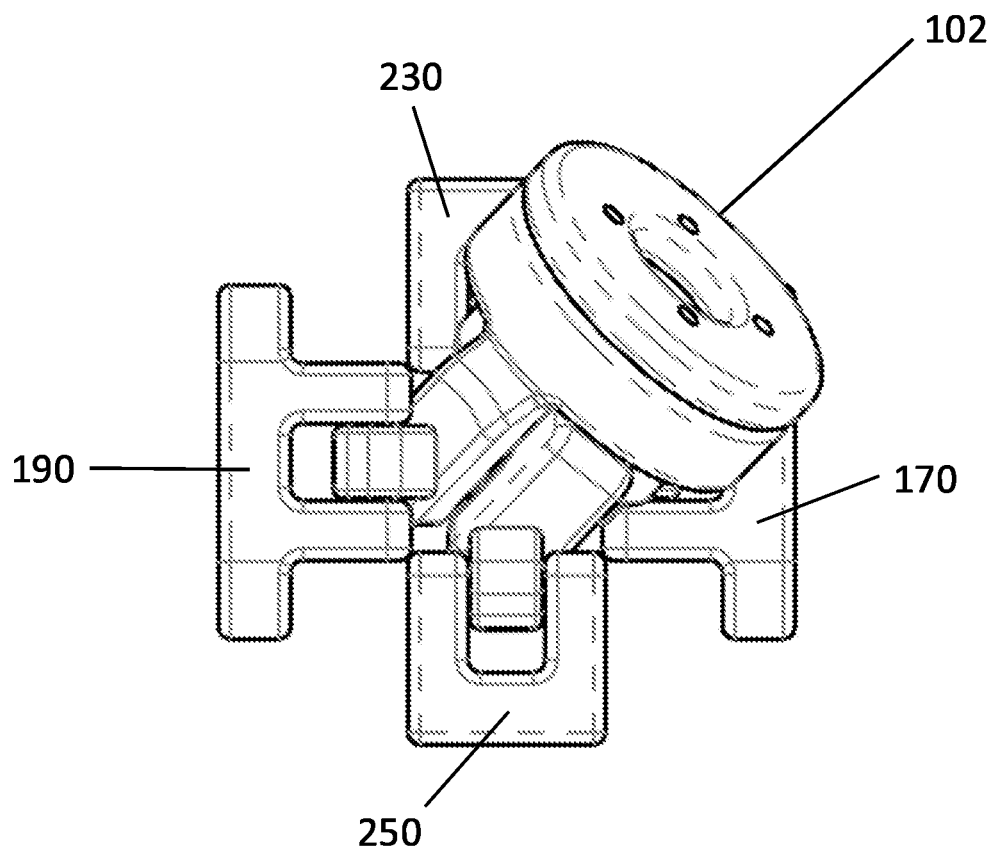
FIG. 10 illustrates a front view of the joint assembly of FIG. 1, with the mounting surface positioned up and right, in accordance with one embodiment of the present disclosure.
Figure 11:
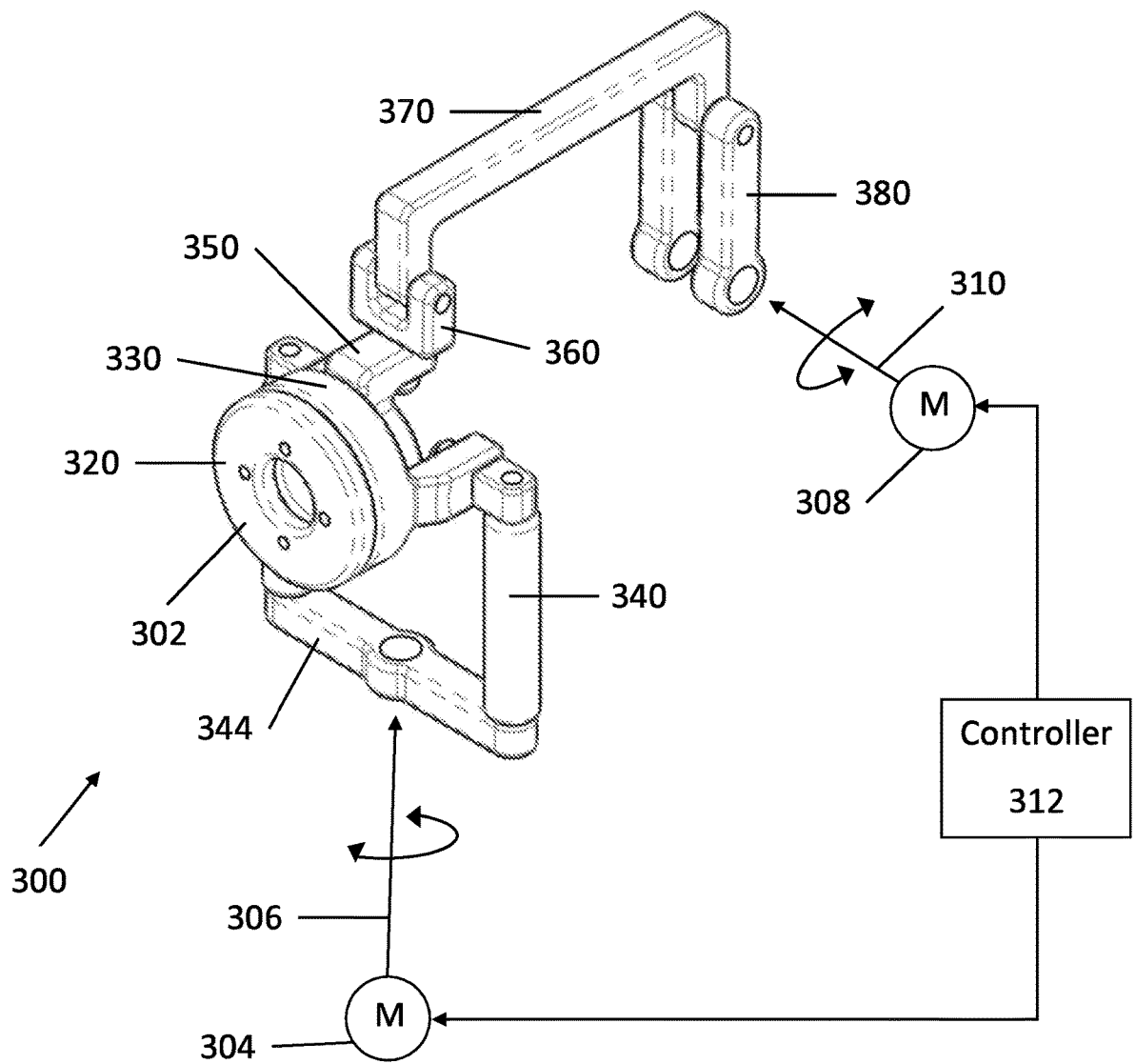
FIG. 11 illustrates an example of a joint assembly 300 for controlling the position of a mounting surface, in accordance with one embodiment of the present disclosure.

FIGS. 3-10 illustrate examples of differing positions of the mounting surface 102, as controlled by joint assembly 100 and motors 104, 108, in accordance with various examples of the present disclosure (see also Table 1). FIG. 3 illustrates mounting surface 102 positioned upwardly, as described above; FIG. 4 illustrates mounting surface 102 positioned downwardly, as described above; FIG. 5 illustrates mounting surface 102 positioned to the right, as described above; FIG. 6 illustrates mounting surface 102 positioned to the left, as described above; FIG. 7 illustrates mounting surface 102 positioned downward to the right (in response to movement by both motors 104, 108 as shown in Table 1); FIG. 8 illustrates mounting surface 102 positioned upwardly to the left (in response to movement by both motors 104, 108 as shown in Table 1); FIG. 9 illustrates mounting surface 102 positioned downward to the left (in response to movement by both motors 104, 108 as shown in Table 1); FIG. 10 illustrates mounting surface 102 positioned upwardly to the right (in response to movement by both motors 104, 108 as shown in Table 1).

Hence, as shown in FIGS. 3-10 and Tabel 1, it can be seen that joint assembly 100 converts the rotary motion of motor 104/shaft 106 and the rotary motion of motor 108/shaft 110 into differing positions of mounting surface 102. It is understood the examples shown in FIGS. 3-10 are non-limiting, and that using embodiments of the present disclosure various other positions and angles of mounting surface 102 can be achieved.

Referring to FIGS. 11-20, another embodiment of a controllable mechanical joint assembly 300 is illustrated. The joint assembly 300 includes a joint mounting surface 302, and as described herein mounting surface 302 can be controllably moved and positioned through a broad range of motion into a variety of differing positions. In one example, a pair of motors 304, 308 (such as stepper motors) are coupled with or connected to joint assembly 300, so that motors 304, 308 can precisely control the motion and position of the mounting surface 302 of joint assembly 300. In one example, motor 304 may be connected to joint assembly 300 via a motor shaft or linkage 306; and motor 308 may be connected to joint assembly 300 via a motor shaft or linkage 310. The motors 304, 308 can each independently rotate their respective shafts 306, 310 either clockwise or counter-clockwise when viewed from the perspective of the motor.

In one example, the joint assembly 300 can be attached to a first surface or structure, and the joint mounting surface 302 can be attached to a device, item, structure, or other surface that is desired to be controllably moved. As described herein, the joint assembly 300 is configured to controllably move mounting surface 302 in a variety of motions and angles with a broad range of movement.

In one example, a controller 312 (such as a programmable logic controller, microprocessor, microcontroller, computer, or other computing device) can be coupled with motors 304, 308 so that the activation and the control of movement of motors 304, 308 are precisely controlled by controller 312, for instance under operation of a computer program, software, artificial intelligence processes, machine learning processes, or other logic.

There are various modes, states or scenarios which motors 304, 308 can be operated together or separately; for instance, as shown in Table 2:

| State of Motor 304 and Direction of Rotation | State of Motor 308 and Direction of Rotation | Resulting Motion of Joint Mounting Surface 302 |
|---|---|---|
| ON (Clockwise) | OFF | Surface 302 tilts Right |
| ON (Counter-Clockwise) | OFF | Surface 302 tilts Left |
| OFF | ON (Clockwise) | Surface 302 tilts Upward |
| OFF | ON (Counter-Clockwise) | Surface 302 tilts Downward |
| ON (Clockwise) | ON (Clockwise) | Surface 302 tilts Right and Upward |
| ON (Clockwise) | ON (Counter-Clockwise) | Surface 302 tilts Right and Downward |
| ON (Counter-Clockwise) | ON (Clockwise) | Surface 302 tilts Left and Upward |
| ON (Counter-Clockwise) | ON (Counter-Clockwise) | Surface 302 tilts Left and Downward |

For each of these modes, the degree or amount to which motor 304 and/or motor 308 is rotated will also control and affect the position (i.e., angular position, tilt) of joint mounting surface 302. In one example, surface 302 can move approximately 94 degrees vertically up or down from a center position and 360 degrees horizontally right or left from a center position.

In this manner, it can be seen that joint assembly 300 converts simple rotary motion of motor 304 through shaft 306, and simple rotary motion of motor 308 through shaft 310, into a variety of differing positions of mounting surface 302 through a broad range of motion.

Figure 12:
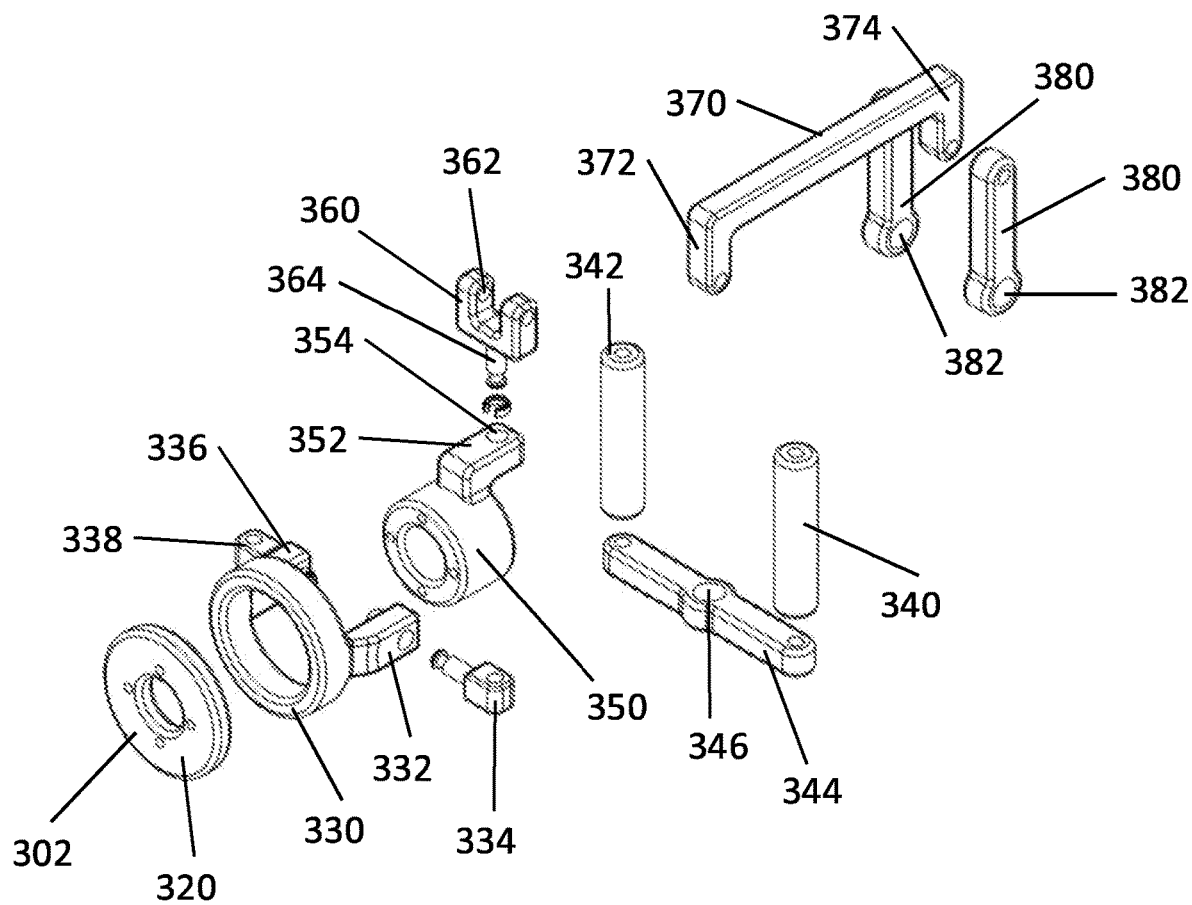
FIG. 12 illustrates an exploded view of the joint assembly of FIG. 11, in accordance with one embodiment of the present disclosure.

Referring to FIG. 12, joint assembly 300 may include a base plate 320 which can be used to form mounting surface 302. A first axis member 330 can be provided and positioned proximate to base plate 320. First axis member 330 may include a first horizontal flange 332 defining an opening to receive a first pivot member 334. First axis member 330 may also include a second horizontal flange 336 defining an opening to receive a second pivot member 338.

A second axis member 350 may be adapted configured to fit within first axis member 330. Second axis member 350 may include a first vertical flange 352 defining an opening 354 to receive U-shaped interface member 360 which may include an opposing pair of openings 362. U-shaped interface member 360 may also include a protrusion 364 extending outwardly and downwardly from the U-shaped interface member 360. Protrusion 364 can be sized to fit within opening 354 of flange 352 of the second axis member 350; and a C-clip or other means can be used to securely connect U-shaped interface member 360 to flange 352.

In one example, a set of screws, bolts, or other securing mechanisms may be used to fixedly attach together base plate 320, first axis member 330, and second axis member 350.

Pivot members 334, 338 each include an opening to receive a pin so that other portions of joint assembly 300 can be connected respectively to the pivot members using a pin, screw, or other securing mechanisms.

The openings 362 of U-shaped interface member 360 can also receive a pin to secure U-shaped interface member 360 to an upper member 370. Upper member 370 may be generally elongated and may include a first end 372 and a second end 374, with each end having an opening therein.

The first end 372 of upper member 370 may be coupled with U-shaped interface member 360, and the second end 374 of upper member 370 may be coupled with one or more shaft members 380. Shaft members 380 may have an opening 382 that can be coupled with motor shaft 310 to motor 308, to provide vertical control of mounting surface 302. In this manner, motor 308 can effectively be coupled with second axis member 350 to control the vertical movement of mounting surface 302/base plate 320.

A horizontal link member 344 can be provided to connect motor 304 and shaft 306 to first axis member 330. In one example, horizontal link member 344 may be generally elongated and may include a central opening 346 to receive shaft 306 for motor 304. Horizontal link member 344 may also include openings at the ends of link member 344, and columns 340, 342 can be connected to horizontal link member 344 at the ends of link member 344. The other ends of columns 340, 342 can be connected with the first pivot member 334 and second pivot member 338 as connected with first axis member 330. Pins, screws, or other securing mechanisms can be used to connect and secure these parts together, in one example.

In this manner, motor 304 is coupled through shaft 306, link member 344 and columns 340, 342 with the first axis member 330—and therefore motor 304 can control the horizontal movement of mounting surface 302/base plate 320 of the joint assembly 300. Stated differently, horizontal link member 344 also includes an opening 346 which is adapted to receive and be securely connected with shaft 306 of motor 304; such that when motor 304 is activated to rotate shaft 306 either clockwise or counter-clockwise, then horizontal link member 344 will also correspondingly rotate clockwise or counter-clockwise in a horizontal plane.

In this manner, these components are connected together: the first axis member 330, pivot members 334, 336, columns 340, 342, horizontal link member 344, shaft 306, and motor 304 to control horizonal movement of mounting surface 302/base plate 320.

In addition, these components are connected together: second axis member 350, U-shaped interface member 360, upper member 370, shaft members 380, motor shaft 310, and motor 308 to control vertical movement of mounting surface 302/base plate 320.

The components of the joint assembly 300 can be made of various materials, or combinations of materials, depending upon the implementation, such as but not limited to metal, plastic, rubber, graphite, wood, magnetized materials, ferrous and non-ferrous materials, polymers, rigid materials, flexible materials, mildly flexible materials, and other conventional materials.

Figure 13:
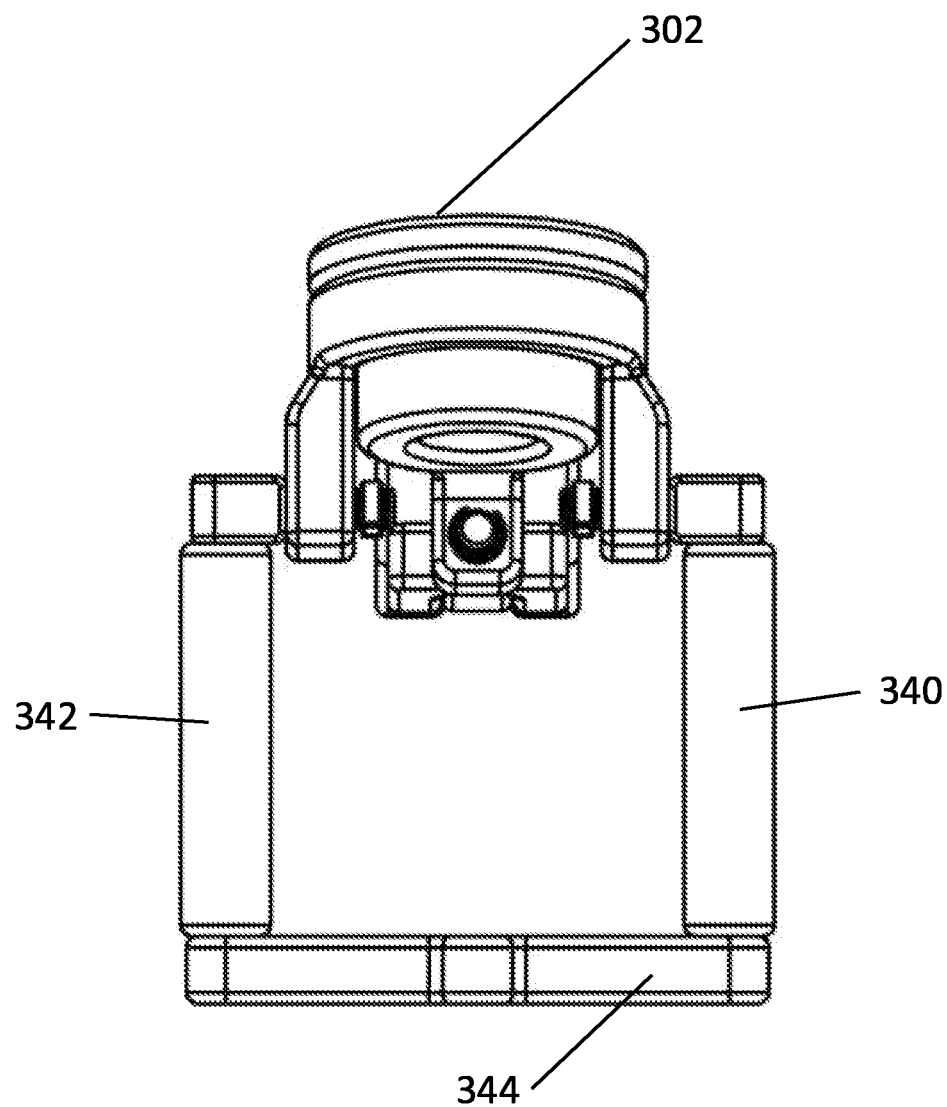
FIG. 13 illustrates a front view of the joint assembly of FIG. 11, with the mounting surface positioned up, in accordance with one embodiment of the present disclosure.
Figure 14:
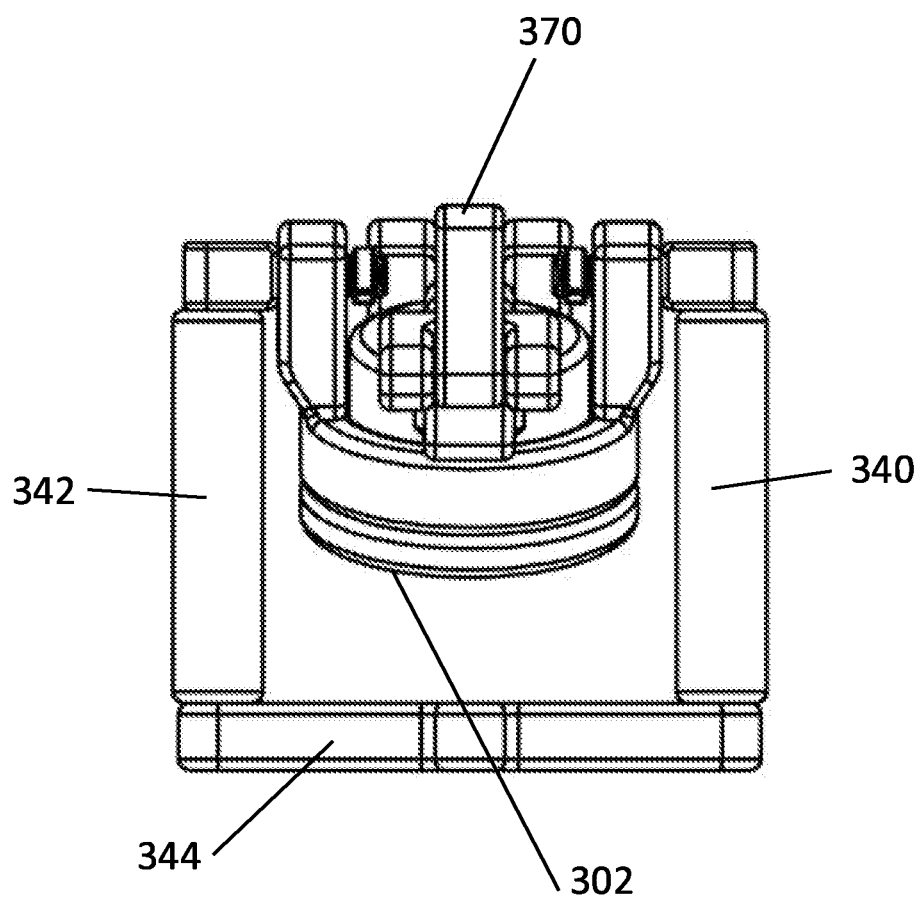
FIG. 14 illustrates a front view of the joint assembly of FIG. 11, with the mounting surface positioned down, in accordance with one embodiment of the present disclosure.
Figure 15:
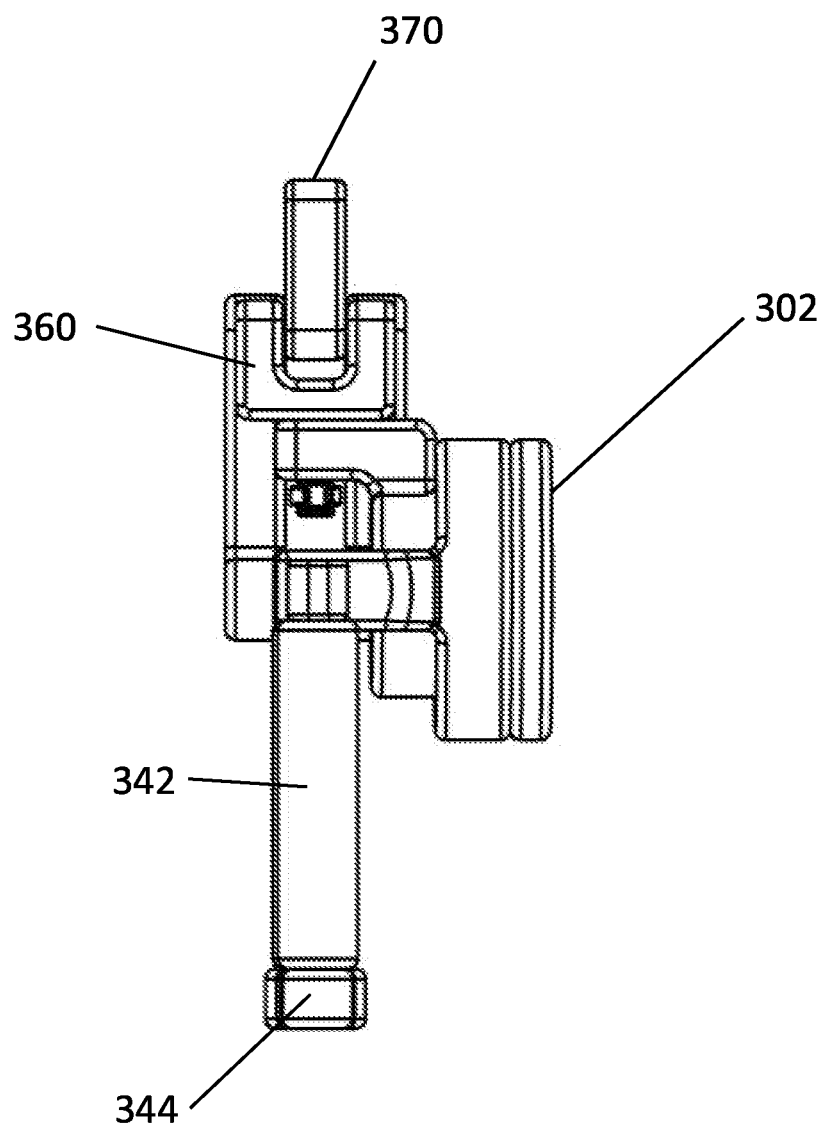
FIG. 15 illustrates a front view of the joint assembly of FIG. 11, with the mounting surface positioned right, in accordance with one embodiment of the present disclosure.
Figure 16:
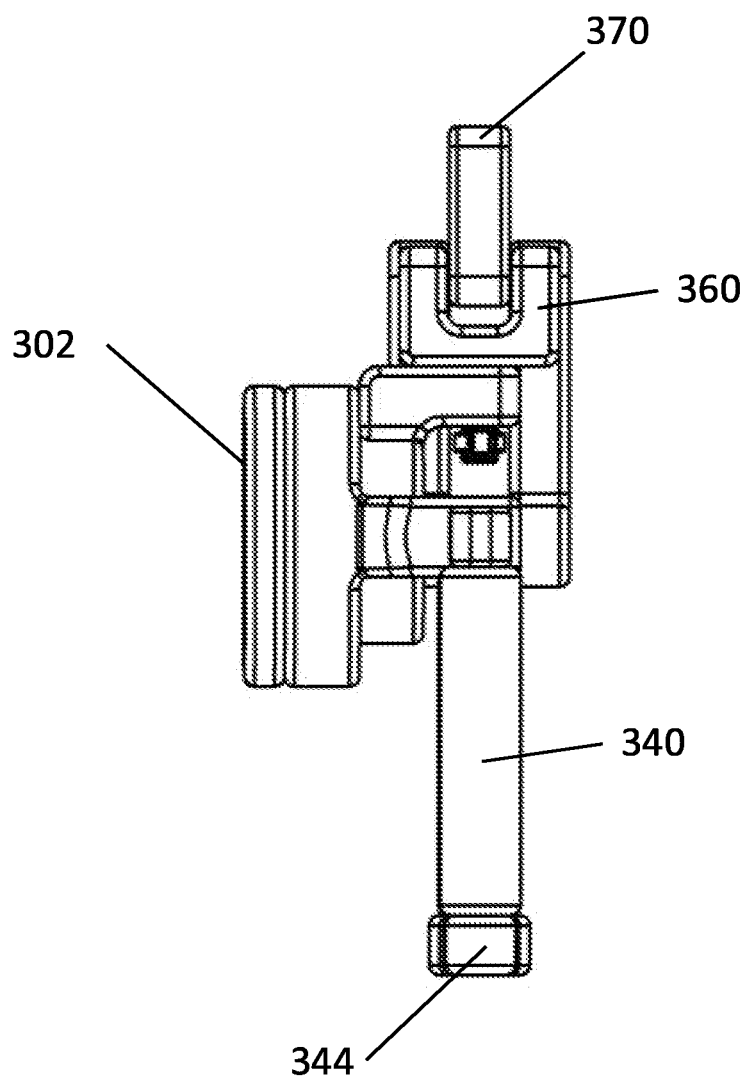
FIG. 16 illustrates a front view of the joint assembly of FIG. 11, with the mounting surface positioned left, in accordance with one embodiment of the present disclosure.
Figure 17:
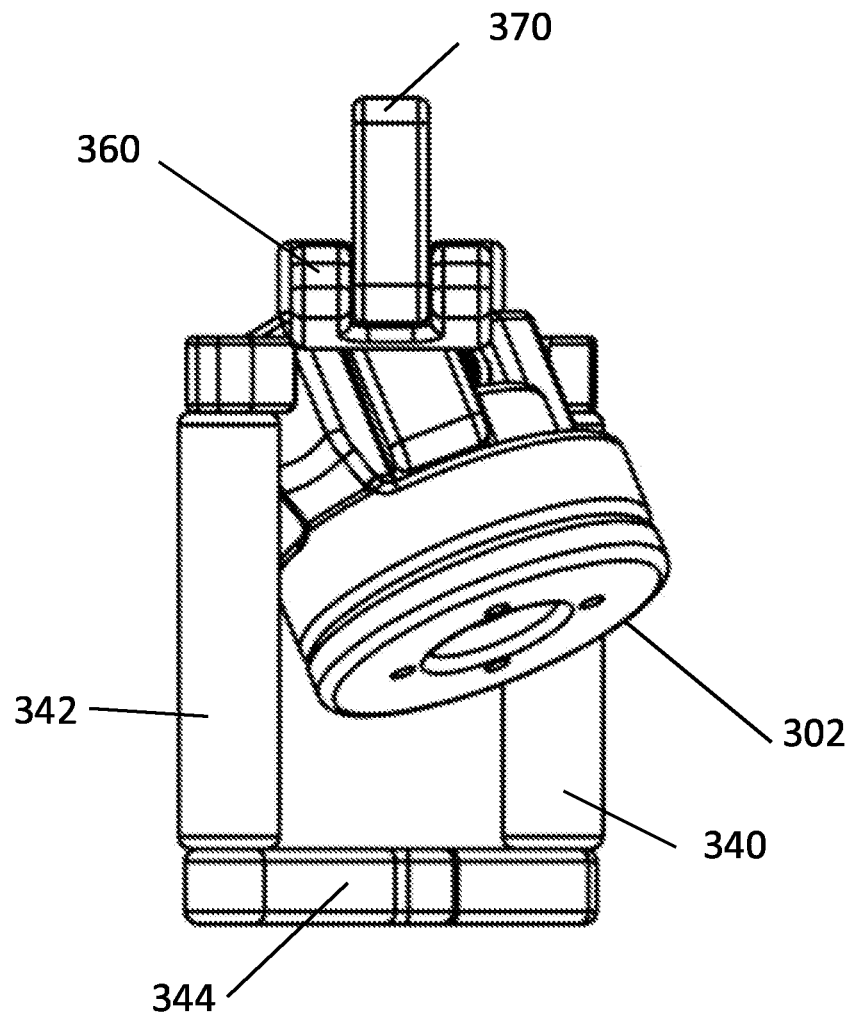
FIG. 17 illustrates a front view of the joint assembly of FIG. 11, with the mounting surface positioned down and right, in accordance with one embodiment of the present disclosure.
Figure 18:
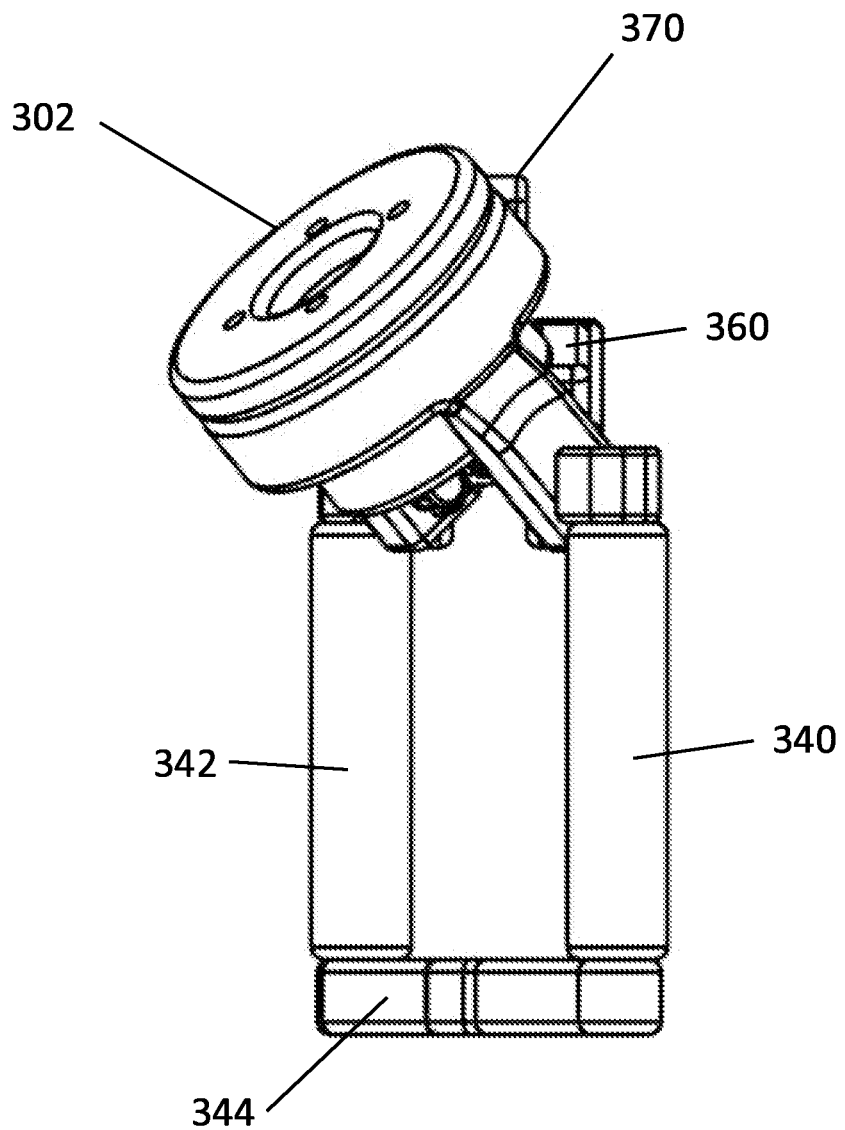
FIG. 18 illustrates a front view of the joint assembly of FIG. 11, with the mounting surface positioned up and left, in accordance with one embodiment of the present disclosure.
Figure 19:
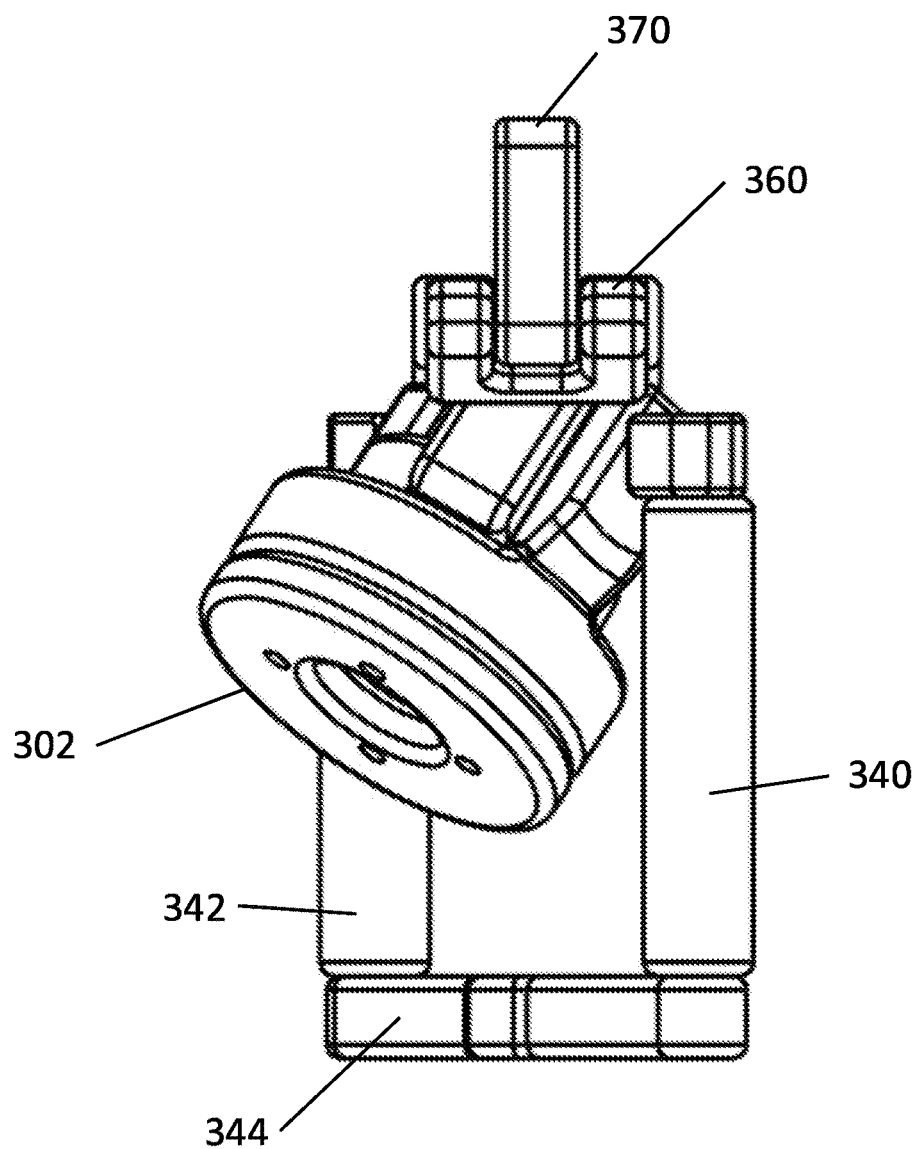
FIG. 19 illustrates a front view of the joint assembly of FIG. 11, with the mounting surface positioned down and left, in accordance with one embodiment of the present disclosure.
Figure 20:
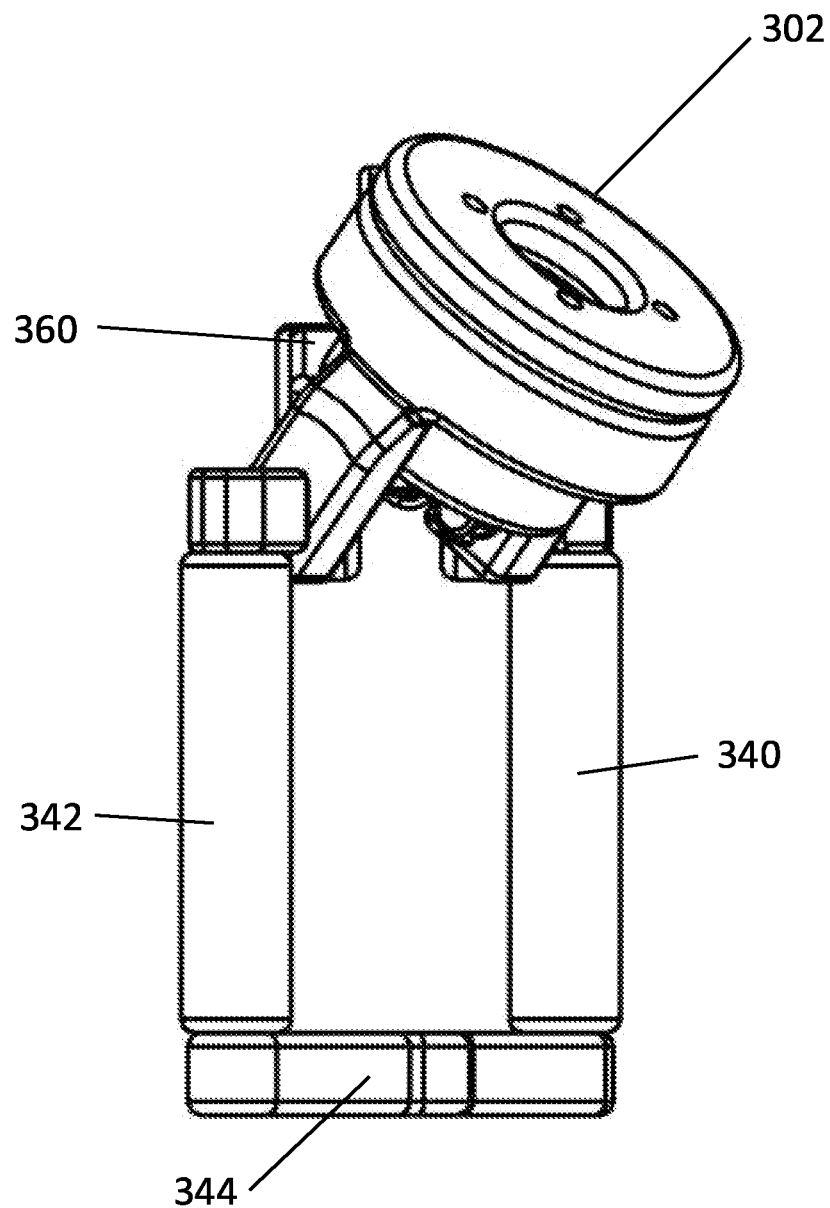
FIG. 20 illustrates a front view of the joint assembly of FIG. 11, with the mounting surface positioned up and right, in accordance with one embodiment of the present disclosure.
Figure 21:
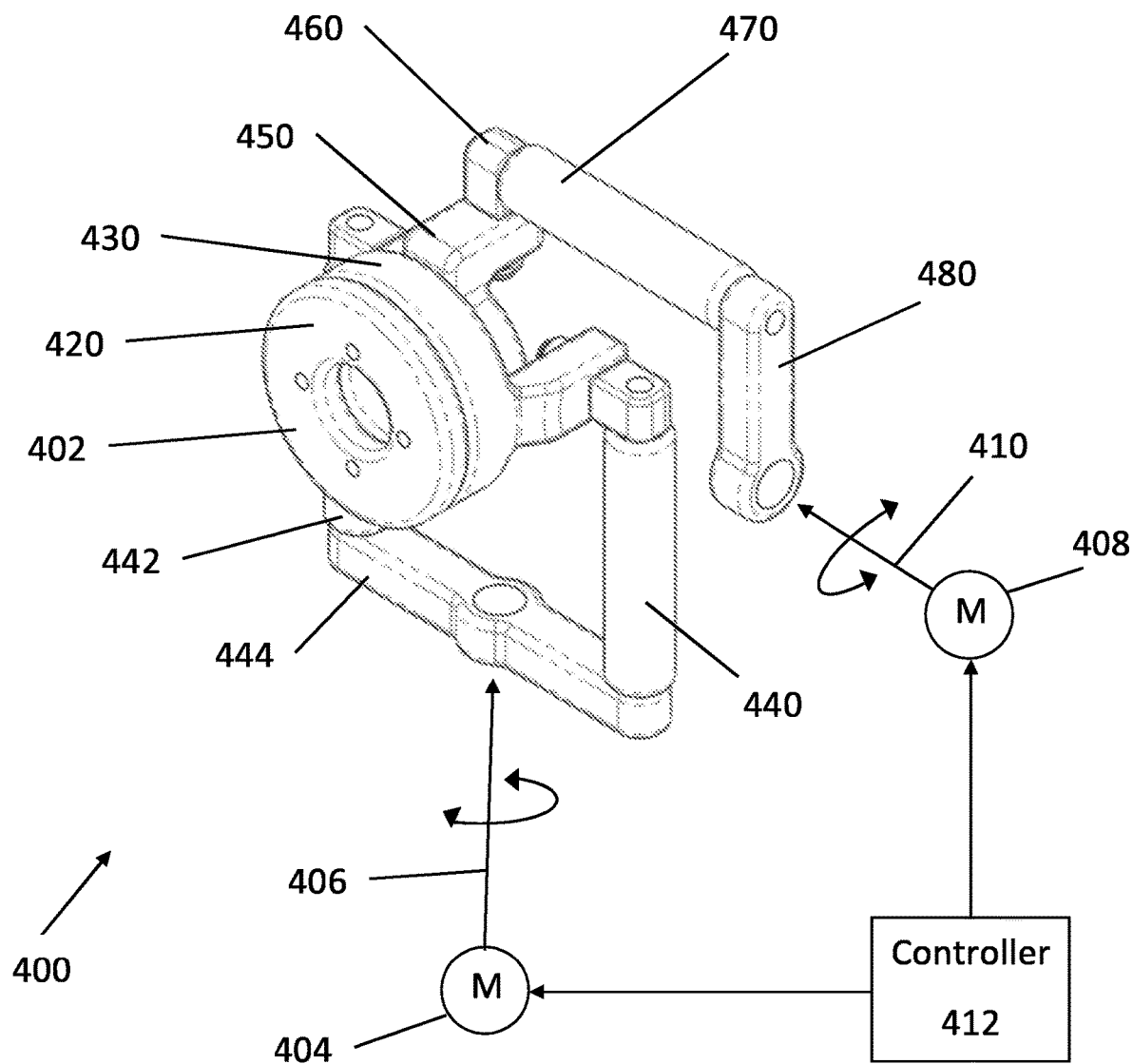
FIG. 21 illustrates an example of a joint assembly 400 for controlling the position of a mounting surface, in accordance with one embodiment of the present disclosure.

FIGS. 13-20 illustrate examples of differing positions of the mounting surface 302, as controlled by joint assembly 300, in accordance with various examples of the present disclosure. FIG. 13 illustrates mounting surface 302 positioned upwardly; FIG. 14 illustrates mounting surface 302 positioned downwardly; FIG. 15 illustrates mounting surface 302 positioned to the right; FIG. 16 illustrates mounting surface 302 positioned to the left; FIG. 17 illustrates mounting surface 302 positioned downward to the right; FIG. 18 illustrates mounting surface 302 positioned upwardly to the left; FIG. 19 illustrates mounting surface 302 positioned downward to the left; FIG. 20 illustrates mounting surface 302 positioned upwardly to the right. It is understood the examples shown in FIGS. 13-20 are non-limiting, and that using embodiments of the present disclosure various other positions and angles of mounting surface 302 can be achieved.

Referring to FIGS. 21-30, another embodiment of a controllable mechanical joint assembly 400 is illustrated. The joint assembly 400 includes a joint mounting surface 402, and as described herein mounting surface 402 can be controllably moved and positioned through a broad range of motion into a variety of differing positions. In one example, a pair of motors 404, 408 (such as stepper motors) are coupled with or connected to joint assembly 400, so that motors 404, 408 can precisely control the motion and position of the mounting surface 402 of joint assembly 400. In one example, motor 404 may be connected to joint assembly 400 via a motor shaft or linkage 406; and motor 408 may be connected to joint assembly 400 via a motor shaft or linkage 410. The motors 404, 408 can each independently rotate their respective shafts 406, 410 either clockwise or counter-clockwise when viewed from the perspective of the motor.

In one example, the joint assembly 400 can be attached to a first surface or structure, and the joint mounting surface 402 can be attached to a device, item, structure, or other surface that is desired to be controllably moved. As described herein, the joint assembly 400 is configured to controllably move mounting surface 402 in a variety of motions and angles with a broad range of movement.

In one example, a controller 412 (such as a programmable logic controller, microprocessor, microcontroller, computer, or other computing device) can be coupled with motors 404, 408 so that the activation and the control of movement of motors 404, 408 are precisely controlled by controller 412, for instance under operation of a computer program, software, artificial intelligence processes, machine learning processes, or other logic.

There are various modes, states or scenarios which motors 404, 408 can be operated together or separately; for instance, as shown in Table 3:

| State of Motor 404 and Direction of Rotation | State of Motor 408 and Direction of Rotation | Resulting Motion of Joint Mounting Surface 402 |
| --- | --- | --- |
| ON (Clockwise) | OFF | Surface 402 tilts Right |
| ON (Counter-Clockwise) | OFF | Surface 402 tilts Left |
| OFF | ON (Clockwise) | Surface 402 tilts Upward |
| OFF | ON (Counter-Clockwise) | Surface 402 tilts Downward |
| ON (Clockwise) | ON (Clockwise) | Surface 402 tilts Right and Upward |
| ON (Clockwise) | ON (Counter-Clockwise) | Surface 402 tilts Right and Downward |
| ON (Counter-Clockwise) | ON (Clockwise) | Surface 402 tilts Left and Upward |
| ON (Counter-Clockwise) | ON (Counter-Clockwise) | Surface 402 tilts Left and Downward |

For each of these modes, the degree or amount to which motor 404 and/or motor 408 is rotated will also control and affect the position (i.e., angular position, tilt) of joint mounting surface 402. In one example, surface 402 can move approximately 158 degrees vertically up or down from a center position, and 360 degrees horizontally/right or left from a center position.

In this manner, it can be seen that joint assembly 400 converts simple rotary motion of motor 404 through shaft 406, and simple rotary motion of motor 408 through shaft 410, into a variety of differing positions of mounting surface 402 through a broad range of motion.

Figure 22:
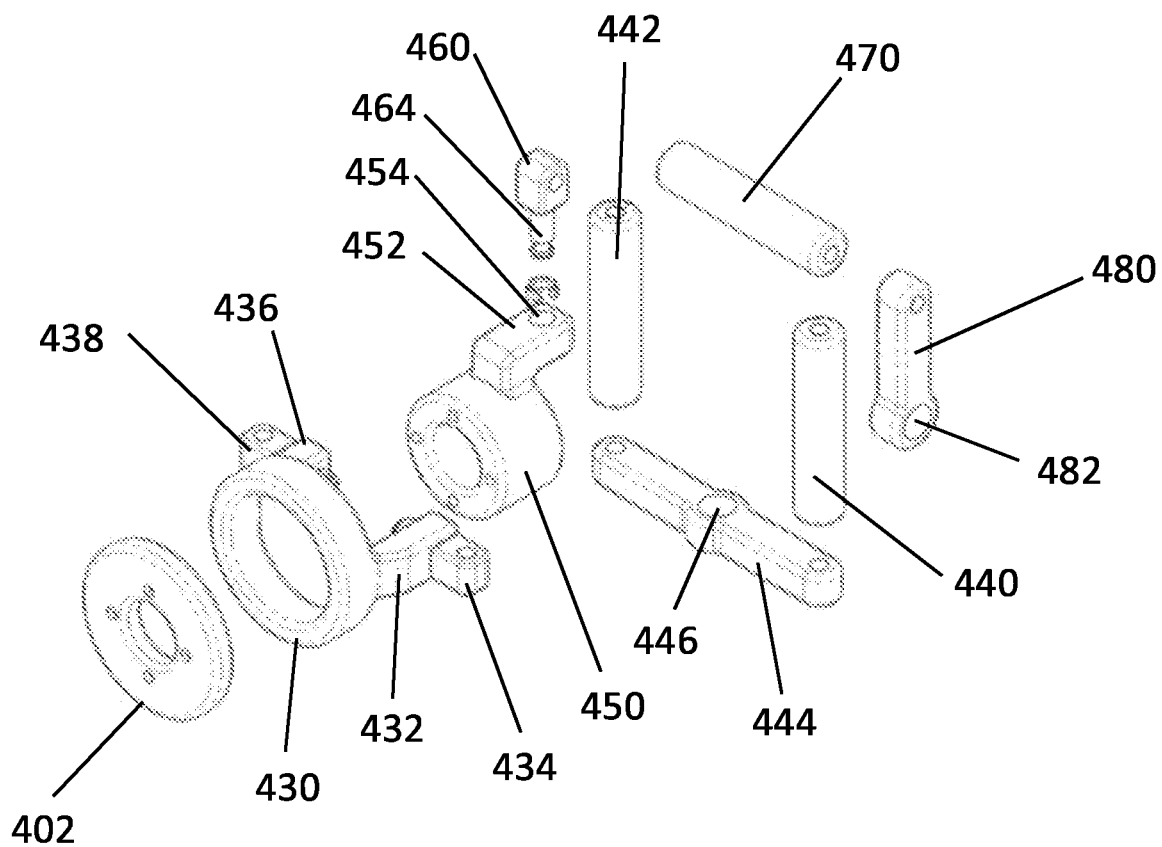
FIG. 22 illustrates an exploded view of the joint assembly of FIG. 21, in accordance with one embodiment of the present disclosure.

Referring to FIG. 22, joint assembly 400 may include a base plate 420 which can be used to form mounting surface 402. A first axis member 430 can be provided and positioned proximate to base plate 420. First axis member 430 may include a first horizontal flange 432 defining an opening to receive a first pivot member 434. First axis member 430 may also include a second horizontal flange 436 defining an opening to receive a second pivot member 438.

A second axis member 450 may be adapted configured to fit within first axis member 430. Second axis member 450 may include a first vertical flange 452 defining an opening 454 to receive a pivot member 460 which may include an opening. Pivot member 460 may also include a protrusion 464 extending outwardly and downwardly from the pivot member 460. The protrusion 464 can be sized to fit within opening 454 of flange 452 of the second axis member 450; and a C-clip or other means can be used to securely connect pivot member 460 to flange 452.

In one example, a set of screws, bolts, or other securing mechanisms may be used to fixedly attach together base plate 420, first axis member 430, and second axis member 450.

Pivot members 434, 438 each include an opening to receive a pin so that other portions of joint assembly 400 can be connected respectively to the pivot members using a pin, screw, or other securing mechanisms.

The opening of pivot member 460 can also receive a pin to secure pivot member 460 to an upper horizontal member/column 470. Upper member 470 may be generally elongated.

The first end of upper member 470 may be coupled with pivot member 460, and the other end of upper member 470 may be coupled with one or more shaft arms/members 480. Shaft arms/members 480 may have an opening 482 that can be coupled with motor shaft 410 to motor 408, to provide vertical control of mounting surface 402. In this manner, motor 408 can effectively be coupled with second axis member 450 to control the vertical movement of mounting surface 402/base plate 420.

A horizontal link member 444 can be provided to connect motor 404 and shaft 406 to first axis member 430. In one example, horizontal link member 444 may be generally elongated and may include a central opening 446 to receive shaft 406 for motor 404. Horizontal link member 444 may also include openings at the ends of link member 444, and columns 440, 442 can be connected to horizontal link member 444 at the ends of link member 444. The other ends of columns 440, 442 can be connected with the first pivot member 434 and second pivot member 438 as connected with first axis member 430. Pins, screws, or other securing mechanisms can be used to connect and secure these parts together, in one example.

In this manner, motor 404 is coupled through shaft 406, link member 444 and columns 440, 442 with the first axis member 430—and therefore motor 404 can control the horizontal movement of mounting surface 402/base plate 420 of the joint assembly 400. Stated differently, horizontal link member 444 also includes an opening 446 which is adapted to receive and be securely connected with shaft 406 of motor 404; such that when motor 404 is activated to rotate shaft 406 either clockwise or counter-clockwise, then horizontal link member 444 will also correspondingly rotate clockwise or counter-clockwise in a horizontal plane.

In this manner, these components are connected together: the first axis member 430, pivot members 434, 436, columns 440, 442, horizontal link member 444, shaft 406, and motor 404 to control horizonal movement of mounting surface 402/base plate 420.

In addition, these components are connected together: second axis member 450, pivot member 460, upper horizontal member/column 470, shaft arm/member 480, motor shaft 410, and motor 408 to control vertical movement of mounting surface 402/base plate 420.

The components of the joint assembly 400 can be made of various materials, or combinations of materials, depending upon the implementation, such as but not limited to metal, plastic, rubber, graphite, wood, magnetized materials, ferrous and non-ferrous materials, polymers, rigid materials, flexible materials, mildly flexible materials, and other conventional materials.

Figure 23:
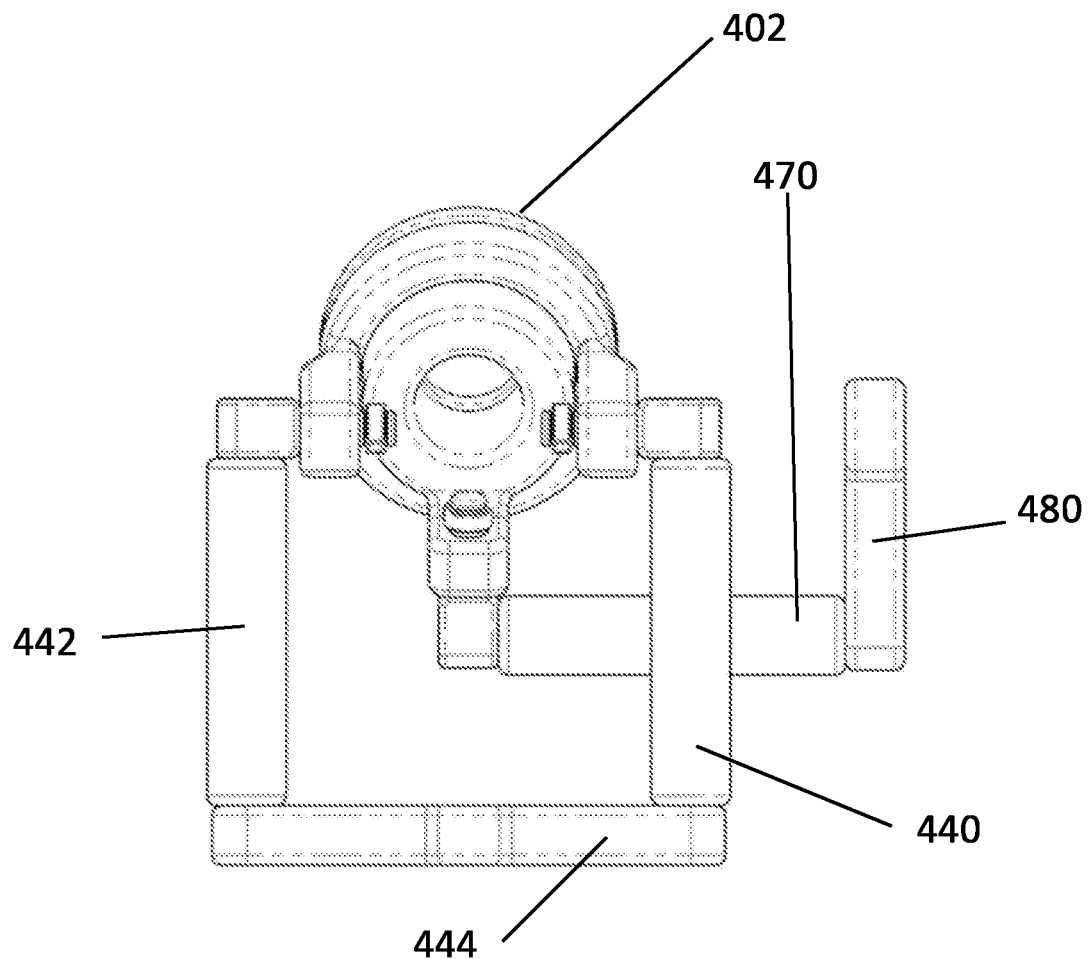
FIG. 23 illustrates a front view of the joint assembly of FIG. 21, with the mounting surface positioned up, in accordance with one embodiment of the present disclosure.

FIGS. 23-30 illustrate examples of differing positions of the mounting surface 402, as controlled by joint assembly 400, in accordance with various examples of the present disclosure. FIG. 23 illustrates mounting surface 402 positioned upwardly; FIG. 24 illustrates mounting surface 402 positioned downwardly; FIG. 25 illustrates mounting surface 402 positioned to the right; FIG. 26 illustrates mounting surface 402 positioned to the left; FIG. 27 illustrates mounting surface 402 positioned downward to the right; FIG. 28 illustrates mounting surface 402 positioned upwardly to the left; FIG. 29 illustrates mounting surface 402 positioned downward to the left; FIG. 30 illustrates mounting surface 402 positioned upwardly to the right. It is understood the examples shown in FIGS. 23-30 are non-limiting, and that using embodiments of the present disclosure various other positions and angles of mounting surface 402 can be achieved.

Joint assemblies 100 (FIGS. 1-10), 300 (FIGS. 11-20), and 400 (FIGS. 21-30), or portions and/or combinations thereof, can be used in a variety of applications, such as but not limited to, robotics, prosthetics (thumb joint, wrist joint, shoulder joint, hip joint, ankle joint, neck); cameras (security or robotic); drones by being able to move the propellers in any given direction; anywhere a ball joint could be used but can be controlled; multi-axis manufacturing; firefighting (robotic arms that can precisely aim water or fire extinguisher with easy to use (X, Y) coordinate system controls).

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations is not a limitation of the present disclosure.

It should be appreciated that in the foregoing description of exemplary embodiments of the disclosure, various features of the disclosure are sometimes grouped together in a single embodiment, figure, or description thereof for the purpose of streamlining the disclosure and aiding in the understanding of one or more of the various aspects. This method of disclosure, however, is not to be interpreted as reflecting an intention that an embodiment requires more features than are expressly recited in each claim. Rather, inventive aspects lie in less than all features of a single foregoing disclosed embodiment, and each embodiment described herein may contain more than one inventive feature.

It will be understood by those skilled in the art that various changes in the form and details may be made from the embodiments shown and described without departing from the spirit and scope of the disclosure.

The invention claimed is:

1. A joint assembly for controlling movement of a mounting surface under the control of a first motor coupled with a first shaft, and a second motor coupled with a second shaft, the joint assembly comprising:
   a first axis member coupled with the mounting surface;
   a first horizontal member having a first end and a second end, the first end of the first horizontal member pivotally coupled with the first axis member;
   a second horizontal member having a first end and a second end, the first end of the second horizontal member pivotally coupled with the first axis member;
   a horizontal link member having a first end and a second end, the first end of the horizontal link member pivotally coupled with the second end of the first horizontal member, and the second end of the horizontal link member pivotally coupled with the second end of the second horizontal member;
   a second axis member coupled with the mounting surface;
   an upper member having a first end and a second end, the first end of the upper member pivotally coupled with the second axis member;
   a lower member having a first end and a second end, the first end of the lower member pivotally coupled with the second axis member; and
   a vertical link member having a first end and a second end, the first end of the vertical link member pivotally coupled with the second end of the upper member, and the second end of the vertical link member pivotally coupled with the second end of the lower member.

2. The joint assembly of claim 1, wherein the first motor is attached via the first shaft to the horizontal link member, and wherein as the first motor rotates the first shaft in a clockwise direction, the mounting surface tilts left.

3. The joint assembly of claim 1, wherein the first motor is attached via the first shaft to the horizontal link member, and wherein as the first motor rotates the first shaft counter-clockwise, the mounting surface tilts right.

4. The joint assembly of claim 1, wherein the second motor is attached via the second shaft to the vertical link member, and wherein as the second motor rotates the second shaft in a clockwise direction, the mounting surface tilts upwardly.

5. The joint assembly of claim 1, wherein the second motor is attached via the second shaft to the vertical link member, and wherein as the second motor rotates the second shaft in a counter-clockwise direction, the mounting surface tilts downwardly.

6. The joint assembly of claim 1, wherein the first axis member has a first horizontal flange extending outwardly from the first axis member, and the first axis member has a second horizontal flange extending outwardly from the first axis member, the first horizontal flange being aligned with the second horizontal flange, the first horizontal flange positioned on an opposing portion of the first axis member as the second horizontal flange.

7. The joint assembly of claim 1, wherein the second axis member has a first vertical flange extending outwardly from the second axis member, and the second axis member has a second vertical flange extending outwardly from the second axis member, the first vertical flange being aligned with the second vertical flange, the first vertical flange positioned on an opposing portion of the second axis member as the second vertical flange.

8. The joint assembly of claim 1, wherein the first axis member, the first horizontal flange, the second horizontal flange, the second axis member, the first vertical flange, and the second vertical flange are formed as a single integrated structure.

9. The joint assembly of claim 1, wherein the first horizontal member, the second horizontal member, and the horizontal link member are formed of metal.

10. A joint assembly for controlling movement of a mounting surface, comprising:
- a first motor coupled with a first shaft;
- a second motor coupled with a second shaft;
- a first axis member coupled with the mounting surface;
- a first horizontal member having a first end and a second end, the first end of the first horizontal member pivotally coupled with the first axis member;
- a second horizontal member having a first end and a second end, the first end of the second horizontal member pivotally coupled with the first axis member;
- a horizontal link member having a first end and a second end, the first end of the horizontal link member pivotally coupled with the second end of the first horizontal member, and the second end of the horizontal link member pivotally coupled with the second end of the second horizontal member;
- a second axis member coupled with the mounting surface;
- an upper member having a first end and a second end, the first end of the upper member pivotally coupled with the second axis member;
- a lower member having a first end and a second end, the first end of the lower member pivotally coupled with the second axis member;
- a vertical link member having a first end and a second end, the first end of the vertical link member pivotally coupled with the second end of the upper member, and the second end of the vertical link member pivotally coupled with the second end of the lower member;
- wherein the first motor is attached via the first shaft to the horizontal link member, and wherein as the first motor rotates the first shaft in a clockwise direction, the mounting surface tilts left; and
- wherein the second motor is attached via the second shaft to the vertical link member, and wherein as the second motor rotates the second shaft in a clockwise direction, the mounting surface tilts upwardly.

11. The joint assembly of claim 10, wherein as the first motor rotates the first shaft counter-clockwise, the mounting surface tilts right.

12. The joint assembly of claim 10, wherein as the second motor rotates the second shaft in a counter-clockwise direction, the mounting surface tilts downwardly.

13. The joint assembly of claim 10, wherein the first axis member has a first horizontal flange extending outwardly from the first axis member, and the first axis member has a second horizontal flange extending outwardly from the first axis member, the first horizontal flange being aligned with the second horizontal flange, the first horizontal flange positioned on an opposing portion of the first axis member as the second horizontal flange.

14. The joint assembly of claim 10, wherein the second axis member has a first vertical flange extending outwardly from the second axis member, and the second axis member has a second vertical flange extending outwardly from the second axis member, the first vertical flange being aligned with the second vertical flange, the first vertical flange positioned on an opposing portion of the second axis member as the second vertical flange.

15. The joint assembly of claim 10, wherein the first axis member, the first horizontal flange, the second horizontal flange, the second axis member, the first vertical flange, and the second vertical flange are formed as a single integrated structure.

16. The joint assembly of claim 10, wherein the first horizontal member, the second horizontal member, and the horizontal link member are formed of metal.

* * * * *